United States Patent
Kumazawa et al.

(10) Patent No.: US 7,999,021 B2
(45) Date of Patent: Aug. 16, 2011

(54) RESIN COMPOSITION AND MOLDED ARTICLE MADE THEREOF

(75) Inventors: Sadanori Kumazawa, Nagoya (JP); Akiyoshi Tamai, Nagoya (JP); Hiroyuki Ohme, Nagoya (JP); Sadayuki Kobayashi, Nagoya (JP); Akinori Kanomata, Nagoya (JP); Koji Yamauchi, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 612 days.

(21) Appl. No.: 11/989,836

(22) PCT Filed: Jul. 31, 2006

(86) PCT No.: PCT/JP2006/315118
§ 371 (c)(1),
(2), (4) Date: Feb. 1, 2008

(87) PCT Pub. No.: WO2007/015448
PCT Pub. Date: Feb. 8, 2007

(65) Prior Publication Data
US 2010/0160505 A1    Jun. 24, 2010

(30) Foreign Application Priority Data

Aug. 4, 2005  (JP) .................. 2005-226072
Dec. 22, 2005 (JP) .................. 2005-369377

(51) Int. Cl.
*C08K 5/00* (2006.01)
*C08L 51/00* (2006.01)

(52) U.S. Cl. .......................... 524/112; 525/64

(58) Field of Classification Search .................. 524/112
See application file for complete search history.

(56) References Cited

U.S. PATENT DOCUMENTS
2005/0038189 A1 *  2/2005  Takimoto et al. ........... 525/117

FOREIGN PATENT DOCUMENTS

| | | | |
|---|---|---|---|
| JP | 6-504799 A | | 6/1994 |
| JP | 7-207142 A | | 8/1995 |
| JP | 9-124923 A | | 5/1997 |
| JP | 11-100480 A | | 4/1999 |
| JP | 2001-207072 A | | 7/2001 |
| JP | 2002-096376 A | | 4/2002 |
| JP | 2002-129026 A | | 5/2002 |
| JP | 2002129026 A | * | 5/2002 |
| JP | 2003-119352 A | | 4/2003 |
| JP | 2003-286396 A | | 10/2003 |
| JP | 2003-313428 A | | 11/2003 |
| JP | 2004-285258 A | | 10/2004 |
| JP | 2005-060637 A | | 3/2005 |
| JP | 2005060637 A | * | 3/2005 |

OTHER PUBLICATIONS

Translation of JP2005060637, Mar. 10, 2005.*
Translation of JP2002129026, May 9, 2002.*

* cited by examiner

*Primary Examiner* — David Wu
*Assistant Examiner* — Hui Chin
(74) *Attorney, Agent, or Firm* — Birch, Stewart, Kolasch & Birch, LLP

(57) ABSTRACT

A resin composition is described that is excellent in strength, impact resistance, heat resistance and moldability, while further allowing for a reduction in the amount of $CO_2$ needed for its production. The resin composition includes a styrene-based resin (A), an aliphatic polyester (B) and at least one species selected from a compatibilizer (C) and a dicarboxylic anhydride (D), wherein the compatibilizer is preferably at least one species selected from: (C-1) a methyl methacrylate polymer; (C-2) a vinyl-based polymer which an epoxy unit or acid anhydride unit is copolymerized; (C-3) a graft polymer in which a methyl methacrylate unit is grafted to a rubbery polymer; and (C-4) a block copolymer having a polylactide segment and a vinyl-based polymer segment.

10 Claims, 1 Drawing Sheet

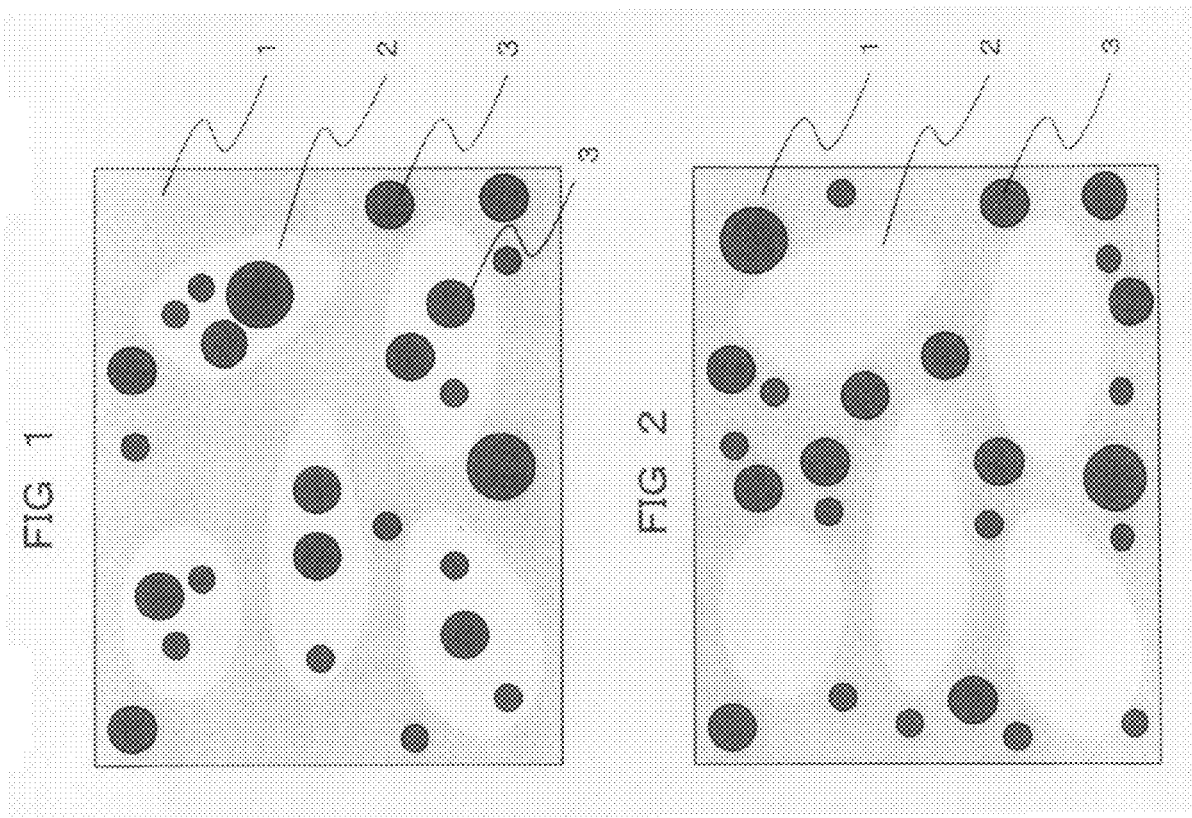

RESIN COMPOSITION AND MOLDED ARTICLE MADE THEREOF

TECHNICAL FIELD

The present invention relates to a resin composition excellent in strength, impact resistance, heat resistance and moldability and further, of low environmental load capable of greatly decreasing $CO_2$ exhaustion in its production and environmental load at its disposal, and a molded article made thereof.

BACKGROUND ART

Styrene-based resins have been used in wide fields such as for electric or electronic parts, automobile, sundries and other various uses due to their excellent mechanical characteristics, moldability and appearance. However, the styrene-based resins are made from petroleum resources, and recently, their $CO_2$ exhaustion at their production and environmental load at disposal of their wastes have been drawing attention. And materials comprising non-petroleum resources have been desired.

Recently, in view of protecting the global environment, biodegradable polymers capable of being degraded in natural environment by the effect of microorganisms living in soil or water have been drawing attention, and various biodegradable polymers have been developed. Among them, polylactide is of relatively low cost and its melting temperature is high as about 170° C., and it has been expected as a melt-moldable biodegradable polymer. In addition, lactic acid, which is the monomer of polylactide, has become possible to be economically produced by fermentation using a microorganism from biomasses as starting material such as corn, and it becomes possible to produce the polylactide in still lower cost. Accordingly, it is expected not only as a biodegradable polymer, but also as a biomass-based biopolymer, and has been investigated for use also as a polymer of general use. However, on the other hand, it has defects in physical characteristics such as low impact resistance and insufficient softness, and improvement in those characteristics has been desired.

In such a circumstance, as a material of low environmental load, a method is disclosed in which polylactide is mixed with a thermoplastic polymer such as polystyrene, polyethylene, polyethylene terephthalate or polypropylene (patent reference 1). However, when they were mixed in that way, although it was possible to obtain a material of low environmental load, any of them was not sufficient to use as a resin for general use and more improvement of mechanical characteristics were necessary.

On the other hand, a biodegradable resin composition comprising polylactide and an amorphous resin having a glass transition temperature higher than that of polylactide is also known, but further improvement is necessary in view of improving both of heat resistance and impact resistance.

Moreover, an aliphatic polyester resin composition comprising an aliphatic polyester and a polymer of stratified structure (patent reference 3), and a resin composition comprising polylactide polymer and a graft polymer obtained by grafting a vinyl-based monomer to a rubbery polymer (patent reference 4) are also known, but these resin composition do not contain a styrene-based resin and they have defect in heat resistance, and further improvement is necessary to use as a polymer for general use.

[Patent reference 1] JP-A-H06-504799 (page 53)
[Patent reference 2] JP-A-2005-60637 (page 2)
[Patent reference 3] JP-A-2003-286396 (page 2)
[Patent reference 4] JP-A-2004-285258 (page 2)

DISCLOSURE OF THE INVENTION

Problem to be Solved by the Invention

The present invention was achieved as a result of investigating to solve the above-mentioned problems of the prior arts, and it aims to provide a resin composition excellent in strength, impact resistance, heat resistance and moldability and further, capable of greatly decreasing $CO_2$ exhaustion at its production and environmental load at its disposal, and a molded article made thereof.

Means for Solving the Problem

We, the inventors, made every effort to solve the above-mentioned problems, and as a result, found that the problems can be solved by a resin composition comprising a styrene-based resin, an aliphatic polyester and one species selected from a compatibilizer and a dicarboxylic anhydride.

That is, the present invention is (1) A resin composition comprising a styrene-based resin (A), an aliphatic polyester resin (B) and at least one species selected from a compatibilizer (C) and a dicarboxylic anhydride (D).

(2) A resin composition described in item (1), wherein the compatibilizer (C) is at least one species described below.

(C-1) methyl methacrylate polymer (C-2) vinyl-based polymer to which 3 wt % or more of glycidyl ester of unsaturated carboxylic acid unit or unsaturated dicarboxylic anhydride unit is copolymerized (C-3) a graft polymer in which 20 to 90 wt % of methyl methacrylate unit is grafted to 10 to 80 wt % of rubbery polymer (C-4) a block copolymer in which polylactide segment represented by the general formula (I) and vinyl-based polymer segment represented by the general formula (II) are bonded in a copolymerization ratio ((I)/(II)) of 99/1 to 1/99 wt parts (but (I)+(II) are 100 wt parts)

[Formula 1]

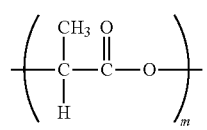

(I)

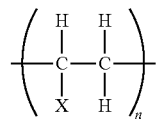

(II)

(X is at least one species selected from hydrogen, an alkyl group, hydroxyl group, an alkyl ester group, cyano group, phenyl group, amido group and a halogen group. M and n denote number average molecular weight and are 1,000 to 100,000, respectively.)

(3) A resin composition described in item (1) wherein the dicarboxylic anhydride (D) is at least any one species of maleic anhydride and succinic anhydride.

(4) A resin composition described in item (1), characterized in that the at least one species selected from a compatibilizer (C) and a dicarboxylic anhydride (D) is the compatibilizer (C).

(5) A resin composition described in items (1) to (4), characterized in that a rubbery polymer (E) is further compounded.

(6) A resin composition described in item (5), characterized in that the rubbery polymer (E) is a graft polymer in which 10 to 70 wt % of aromatic vinyl-based unit and 10 to 50 wt % of vinyl cyanide-based unit are graft polymerized to 10 to 80 wt % of a rubbery polymer.

(7) A resin composition described in item (4), wherein the compatibilizer (C) is (C-2) and/or (C-3) component(s), and when the total area of (C-2) and/or (C-3) in cross-sectional photomicrograph of the resin composition is put as 100%, an areal ratio of (C-2) and/or (C-3) in the aliphatic polyester (B) is 10 to 90%.

(8) A resin composition described in item (5), wherein, when total area of (C-2), (C-3) and the rubbery polymer (E) in cross-sectional photomicrograph of the resin composition is put as 100%, an areal ratio of (C-2), (C-3) and the rubbery polymer (E) in the aliphatic polyester (B) is 10 to 90%

(9) A resin composition described in item (1), in which at least one species selected from polycarbonate, aromatic polyester, polyethylene, polypropylene and polyvinyl chloride (F) is further compounded.

(10) A resin composition described in item (1), in which a polymer having a volume resistivity of 10-13 Ωcm or less (G) is further compounded.

(11) A resin composition described in item (1), in which the amount of the aliphatic polyester (B) is less than 50 wt % relative to the total of the styrene-based resin (A) and the aliphatic polyester (B) which accounts for 100 wt %.

(12) A molded article made of the resin composition described in item (1).

Effect of the Invention

In the resin composition and the molded article of the present invention, by the resin composition comprising the styrene-based resin (A), the aliphatic polyester resin (B) and at least one species selected from the compatibilizer (C) and the dicarboxylic anhydride (D), a resin composition of low environmental load excellent in strength, impact resistance, heat resistance and moldability, and a molded article made thereof can be obtained.

BRIEF EXPLANATION OF THE DRAWINGS

FIG. 1 is an illustration showing a phase morphology of the resin composition of the present invention.
FIG. 2 is an illustration showing a phase morphology of the resin composition of a prior art.

EXPLANATION OF CODE

1: matrix of the component (A)
2: matrix of the component (B)
3: dispersed phase

BEST EMBODIMENT FOR CARRYING OUT THE INVENTION

The resin composition of the present invention is explained concretely below.

The styrene-based resin (A) of the present invention can be obtained by providing an aromatic vinyl-based monomer (b) such as styrene, α-methyl styrene, o-methyl styrene, p-methyl styrene, o-ethyl styrene, p-ethyl styrene and p-t-butyl styrene, or the aromatic vinyl-based monomer (b) and other copolymerizable monomer to publicly known bulk polymerization, bulk suspension polymerization, solution polymerization, precipitation polymerization or emulsion polymerization.

The styrene-based resin (A) of the present invention does not include a graft polymer in which an aromatic vinyl-based unit is graft polymerized to a rubbery polymer (b). The graft polymer in which an aromatic vinyl-based unit or the like is graft polymerized to a rubbery polymer (b) is included in the rubbery polymer (E) mentioned later.

A representative styrene-based resin (A) is, for example, a vinyl copolymer obtained by copolymerizing, relative to 1 to 100 wt % of the aromatic vinyl-based unit (b), 0 to 99 wt %, preferably 10 to 90 wt % in view of impact resistance and heat resistance, more preferably 30 to 80 wt % of unsaturated carboxylic acid alkyl ester-based unit (a), 0 to 50 wt %, preferably 10 to 45 wt % in view of impact resistance and heat resistance, more preferably 20 to 35 wt % of vinyl cyanide based unit (c), and 0 to 99 wt %, preferably 1 to 80 wt % in view of impact resistance and heat resistance, more preferably 5 to 50 wt % of other vinyl-based unit copolymerizable with these components (d).

The unsaturated carboxylic acid alkyl ester based monomer (a) used for the styrene-based resin (A) of the present invention is not especially limited, but acrylic ester and/or methacrylic ester having alkyl group or substituted alkyl group with 1 to 6 carbons are preferable.

As examples of the unsaturated carboxylic acid alkyl ester based monomer (a), methyl (meth)acrylate, ethyl (meth)acrylate, n-propyl (meth)acrylate, n-butyl (meth)acrylate, t-butyl (meth)acrylate, n-hexyl (meth)acrylate, cyclohexyl (meth)acrylate, chloromethyl (meth)acrylate, 2-chloroethyl (meth)acrylate, 2-hydroxyethyl (meth)acrylate, 3-hydroxypropyl (meth)acrylate, 2,3,4,5,6-pentahydroxyhexyl (meth)acrylate, 2,3,4,5-tetrahydroxypentyl (meth)acrylate or the like are mentioned, and among them, methyl methacrylate is most preferably used. These can be used alone or in combination of two or more species.

The vinyl cyanide-based monomer (c) used for the styrene-based resin (A) is not especially limited, but as examples, acrylonitrile, methacrylonitrile, ethacrylonitrile or the like are mentioned, and among them, acrylonitrile is preferably used. These can be used alone or in combination of two or more species.

As the copolymerizable other vinyl-based monomer (d) used for the styrene-based resin (A) of the present invention is not especially limited as far as it is copolymerizable with the unsaturated carboxylic acid-based monomer (a), the aromatic vinyl-based monomer (b) or the vinyl cyanide-based monomer (c), and as examples, maleimide-based monomers such as N-methyl maleimide, N-ethyl maleimide, N-cyclohexyl maleimide and N-phenyl maleimide, unsaturated carboxylic acid based monomers such as acrylic acid and methacrylic acid, unsaturated dicarboxylic acid-based monomers and their ester-based monomers such as maleic acid and maleic acid monoethyl ester, vinyl-based monomers having hydroxyl group such as 3-hydroxy-1-propene, 4-hydroxy-1-butene, cis-4-hydroxy-2-butene, trans-4-hydroxy-2-butene, 3-hydroxy-2-methyl-1-propene, cis-5-hydroxy-2-pentene, trans-5-hydroxy-2-pentene, 4,4-dihydroxy-2-butene, vinyl-based monomers having epoxy group such as allylglycidylether, styrene-p-glycidylether and p-glycidyl styrene, vinyl-based monomers having amino group or its derivatives such as acrylamide, methacrylamide, N-methyl acrylamide, butoxymethyl acrylamide, N-propyl methacrylamide, aminoethyl acrylate, propylaminoethyl acrylate, dimethylaminoethyl methacrylate, ethylaminopropyl methacrylate, phenylaminoethyl methacrylate, cyclohexylaminoethyl methacrylate, N-vinyl diethylamine, N-acetyl vinylamine, allylamine, methallylamine, N-methyl allylamine and p-aminostyrene, vinyl-based monomer having oxazoline group such as 2-isopropenyl oxazoline, 2-vinyl oxazoline, 2-acroyl oxazoline and 2-styryl oxazoline, etc., are mentioned and these can be used alone or in combination of two or more species. Here, the unsaturated carboxylic acid glycidyl ester such as glycidyl acrylate, glycidyl methacrylate, glycidyl ethacrylate and glycidyl itaconate or the unsaturated dicarboxylic anhydride such as maleic anhydride, itaconic anhydride and citraconic anhydride may be copolymerized, but in view of flowability, the copolymerization ratio of the unsaturated dicarboxylic acid glycidyl ester or the unsaturated dicarboxylic anhydride is less than 3 wt %.

There is no limitation to the characteristics of the styrene-based resin (A), but because it is possible to obtain a resin composition excellent in impact resistance and moldability, a styrene-based resin of intrinsic viscosity [η] measured in methyl ethyl ketone solvent at 30° C. in the range of 0.20 to 2.00 dl/g is preferable, 0.25 to 1.50 dl/g is more preferable, 0.28 to 1.00 dl/g is still more preferable, and because it is possible to obtain a resin composition excellent in heat resistance, a styrene-based resin in the range of 0.30 to 0.50 is especially preferable.

The aliphatic polyester (B) of the present invention is not especially limited, and a polymer having aliphatic hydroxycarboxylic acid as its main constituent, a polymer having aliphatic polycarboxylic acid and aliphatic polyalcohol as its main constituent, etc., are mentioned. For example, as the polymers having aliphatic hydroxycarboxylic acid as its main constituent, polyglycolic acid, polylactide, poly-3-hydroxylactic acid, poly-4-hydroxylactic acid, poly-4-hydroxyvaleric acid, poly-3-hydroxyhexanoic acid, polycaprolactone etc., are mentioned, and as the polymers having aliphatic polycarboxylic acid and aliphatic polyalcohol as its main constituent, polyethylene adipate, polyethylene succinate, polybutylene adipate, polybutylene succinate, etc., are mentioned. These aliphatic polyester can be used alone of in combination of two or more species. Among these aliphatic polyesters, the polymer having hydroxycarboxylic acid as its main constituent is preferable, and in view of heat resistance, polylactide is especially preferably used.

The polylactide is the polymer of which main constituent is L-lactic acid and/or D-lactic acid, but it may contain other copolymerization component as far as the other component does not spoil the purpose of the present invention.

As these other copolymerization units, for example, polycarboxylic acids, polyalcohols, hydroxycarboxylic acids, lactones, etc., are mentioned, and concretely, polycarboxylic acids such as oxalic acid, malonic acid, succinic acid, glutaric acid, adipic acid, azelaic acid, sebacic acid, dodecane dionic acid, fumaric acid, cyclohexane dicarboxylic acid, terephthalic acid, isophthalic acid, phthalic acid, 2,6-naphthalene dicarboxylic acid, 5-sodium sulfoisophthalic acid and 5-tetrabutyl phosphonium sulfoisophthalic acid, polyalcohols such as ethylene glycol, propylene glycol, butane diol, heptane diol, hexane diol, octane diol, nonane diol, decane diol, 1,4-cyclohexane dimethanol, neopentyl glycol, glycerin, trimethylol propane, pentaerythritol, bisphenol A, aromatic polyalcohol obtained by addition reaction of ethylene oxide to bisphenol, diethylene glycol, triethylene glycol, polyethylene glycol, polypropylene glycol, polytetramethylene glycol, etc., hydroxycarboxylic acids such as glycolic acid, 3-hydroxylactic acid, 4-hydroxylactic acid, 4-hydroxyvaleric acid, 6-hydroxycaproic acid, hydroxybenzoic acid, etc., lactones such as glycolide, ε-caprolactone glycolide, ε-caprolactone, β-propiolactone, δ-butyrolactone, β- or γ-butyrolactone, pivalolactone, δ-valerolactone, etc., can be used. These copolymerization components can be used alone or in combination of two or more species.

To obtain a high heat resistance by the polylactide, it is preferable that the optical purity of the lactic acid component is high, and, in the total lactic acid component, L-type or D-type is preferably contained 80 mol % or more, more preferably 90 mol % or more, especially preferably 95 mol % or more. Upper limit is 100 mol %.

Moreover, in view of dimensional stability such as contraction, in the total lactic acid of polylactide, L-type or D-type is preferably contained in the range of 50 to 100 mol %, more preferably contained in the range of 70 to 98 mol %, and still more preferably is contained in the range of 80 to 95 mol %.

And, as the aliphatic polyester (B) of the present invention, in view of heat resistance and moldability, it is preferable to use a polylactide stereocomplex. As a method for forming the polylactide stereocomplex, for example, a method of mixing by melt-kneading or solution-kneading of poly-L-lactide in which L-type is 90 mol % or more, preferably 95 mol % or more, more preferably 98 mol % or more and poly-D-lactide in which D-type is 90 mol % or more, preferably 95 mol % or more, more preferably 98 mol % or more, is mentioned. On the other hand, as another method, a method of block copolymerization of poly-L-lactide and poly-D-lactide is also mentioned, and because it is easy to form a polylactide stereocomplex, the method of block copolymerization of poly-L-lactide and poly-D-lactide is preferable.

As the aliphatic polyester (B) of the present invention, it may be used alone or in combination of two or more species, for example, it is possible to use the polylactide and polybutylene succinate together, or to use poly-L-lactide and a block copolymer of poly-L-lactide and poly-D-lactide which forms a polylactide stereocomplex, together.

As methods for producing the aliphatic polyester (B), publicly known methods can be applied. In particular, as for polylactide, direct polymerization method from lactic acid, ring-opening polymerization via lactide, etc., can be applied.

As for the molecular weight and the molecular weight distribution of the aliphatic polyester (B), they are not especially limited as far as its molding is substantially possible, but as for the weight average molecular weight, in view of heat resistance, it is preferably 10,000 or more, more preferably 40,000 or more, still more preferably 80,000 or more, particularly preferably 100,000 or more, most preferably, 130,000 or more. The upper limit is not especially limited, but in view of flowability, 500,000 or less is preferable, 300,000 or less is more preferable, 250,000 or less is still more preferable. In particular, because it is possible to obtain a resin composition excellent in heat resistance, it is preferable that the weight average molecular weight is in the range of 200,000 to 250,000. The weight average molecular weight mentioned here is the weight average molecular weight measured by gel permeation chromatography (GPC) using hexafluoroisopropanol as solvent and converted to that of polymethyl methacrylate (PMMA).

The melting temperature of the aliphatic polyester (B) is not especially limited, but in view of heat resistance, 90° C. or higher is preferable and 150° C. or higher is more preferable. The melting temperature mentioned here is the temperature of peak top of the endothermic peak measured by differential scanning calorimeter (DSC).

In the present invention, because a resin composition excellent in heat resistance can be obtained, it is preferable that the melt viscosity ratio of the styrene-based resin (A) and the aliphatic polyester (B), ((A)/(B)), is in the range of 0.1 to 10.

In the present invention, because a resin composition excellent in impact resistance and heat resistance can be obtained, it is preferable that the number average diameter of the dispersed particle phases of the styrene-based resin (A) or the aliphatic polyester (B) is in the range of 10 nm to 100 µm, and more preferably 50 nm to 10 µm, and especially preferably 100 nm to 1000 nm.

In the present invention, the compatibilizer (C) functions to improve the compatibility between the styrene-based resin (A) and the aliphatic polyester (B). By compounding the compatibilizer (C), the phase morphology of the styrene-based resin (A) and the aliphatic polyester (B) is affected and the characteristics such as strength, impact resistance, heat resistance and moldability are greatly improved.

As examples of the compatibilizer (C), it is preferable to be any one or more of the mentioned below.

(C-1) methyl methacrylate polymer (C-2) a vinyl-based polymer to which 3 wt % or more of unsaturated carboxylic acid glycidyl ester unit or unsaturated dicarboxylic anhydride unit is copolymerized (C-3) a graft polymer in which 20 to 90 wt % of methyl methacrylate unit is graft polymerized to 10 to 80 wt % of a rubbery polymer (C-4) a block copolymer in which a polylactide segment represented by the general formula (I) and a vinyl-based polymer segment represented by the general formula (II) are bonded in a copolymerization ratio, ((I)/(II)), of 99/1 to 1/99 wt parts (here, (I)+(II)=100 wt parts).

[Formula 2]

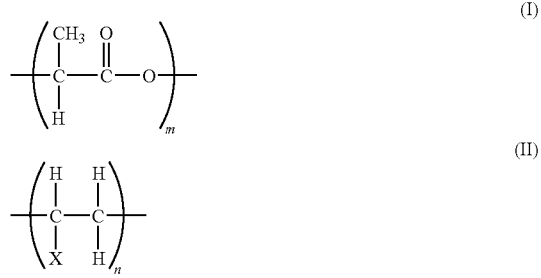

(X denotes at least one selected from hydrogen, an alkyl group, hydroxyl group, an alkyl ester group, cyano group, phenyl group, amido group and a halogen group. m and n denote number average molecular weight.)

The methyl methacrylate polymer (C-1) of the present invention is a polymer and/or copolymer of methyl methacrylate, but does not include the graft polymer in which methacrylate unit is grafted to a rubbery polymer. The graft polymer in which 20 to 90 wt % methyl methacrylate unit is grafted to 10 to 80 wt % rubbery polymer is included in the graft polymer (C-3) mentioned later, and other graft polymer in which methyl methacrylate unit is grafted to a rubbery polymer is included in the rubbery polymer (E) mentioned later.

The methyl methacrylate polymer (C-1) of the present invention contains methyl methacrylate unit as the main component, and in view of impact resistance and heat resistance, it is preferable to contain 70 mol % or more of methyl methacrylate unit. It may be a copolymer containing other vinyl-based monomer component unit of preferably 30 mol % or less, more preferably 20 mol % or less.

In the methyl methacrylate polymer (C-1) of the present invention, as other copolymerizable vinyl-based monomers, acrylic acid, methyl acrylate, ethyl acrylate, propyl acrylate, butyl acrylate, 2-ethylhexyl acrylate, aminoethyl acrylate, propylaminoethyl acrylate, 2-hydroxyethyl acrylate, 2-hydroxypropyl acrylate, dicyclopentenyloxyethyl acrylate, dicyclopentanyl acrylat, butanediol diacrylate, nonanediol diacrylate, polyethylene glycol diacrylate, methyl 2-hydroxymethyl acrylate, ethyl 2-hydroxymethyl acrylate, methacrylic acid, ethyl methacrylate, propyl methacrylate, butyl methacrylate, cyclohexyl methacrylate, 2-ethylhexyl methacrylate, hydroxyethyl methacrylate, allymethacrylate, dimethylaminoethyl methacrylate, ethylaminopropyl methacrylate, phenylaminoethyl methacrylate, cyclohexylaminoethyl methacrylate, 2-hydroxyethyl methacrylate, 2-hydroxypropyl methacrylate, dicyclopentanyloxyethyl methacrylate, dicyclopentanyl methacrylate, pentamethylpiperidyl methacrylate, tetramethylpiperidyl methacrylate, benzyl methacrylate, ethylene glycol dimethacrylate, propylene glycol dimethacrylate, polyethylene glycol dimethacrylate, etc., are mentioned, and one or more species of these can be used. In addition, other vinyl-based monomer can be copolymerized, and as those other vinyl-based monomers, aromatic vinyl-based monomers such as α-methylstyrene, o-methylstyrene, p-methylstyrene, o-ethylstyrene, p-ethylstyrene and p-t-butylstyrene, vinyl cyanide-based monomers such as acrylonitrile, methacrylonitrile and ethacrylonitrile, N-substituted maleimides such as allyl glycidyl ether, styrene-p-glycidyl ether, p-glycidyl styrene, maleic acid monoethyl ester, itaconic acid, vinylacetate, N-methyl maleimide, N-ethyl maleimide, N-cyclohexyl maleimide and N-phenyl maleimide, acrylamide, methacrylamide, N-methyl acrylamide, butoxymethyl acrylamide, N-propyl methacrylamide, N-vinyl diethylamine, N-acetyl vinylamine, allylamine, methallylamine, N-methyl allylamine, p-aminostyrene, 2-isopropenyl-oxazoline, 2-vinyl oxazoline, 2-acroyl oxazoline and 2-styryl oxazoline, etc., are mentioned, and one or more species of these can be used. Here, in the methyl methacrylate polymer (C-1) of the present invention, as other copolymerizable vinyl-based monomers, glycidyl esters of unsaturated carboxylic acid such as glycidyl acrylate, glycidyl methacrylate, glycidyl ethacrylate and glycidyl itaconate, or unsaturated dicarboxylic anhydrides such as maleic anhydride, itaconic anhydride and citraconic anhydride, may be copolymerized, but in view of flowability, the copolymerization ratio of the glycidyl ester of unsaturated carboxylic acid or the unsaturated dicarboxylic anhydride is less than 3 wt %. Those copolymerized with 3 wt % or more of the glycidyl ester of unsaturated carboxylic acid or the unsaturated dicarboxylic anhydride are included in the vinyl-based polymer (C-2) mentioned later.

In the present invention, the weight average molecular weight of the methyl methacrylate polymer (C-1) is not especially limited, but in view of impact resistance and heat resistance, it is preferable to be in the range of 10,000 to 450,000, more preferably in the range of 30,000 to 200,000, still more preferably in the range of 50,000 to 150,000. The weight average molecular weight mentioned here is the weight average molecular weight measured by gel permeation chromatography (GPC) using hexafluoroisopropanol as solvent and converted to that of polymethyl methacrylate (PMMA).

In the present invention, glass transition temperature (Tg) of the methyl methacrylate polymer (C-1) is not especially limited, but in view of heat resistance, 60° C. or higher is preferable, 70° C. or higher is more preferable, 80° C. or higher is still more preferable, 90° C. or higher is particularly preferable and 100° C. or higher is most preferable. The upper limit is not limited, but in view of moldability, 150° C. or lower is preferable. The Tg mentioned here is the Tg determined by measurement by differential scanning calorimeter (DSC) and is the temperature at which specific heat capacity change in the Tg region becomes to a half value.

In the present invention, stereotacticity of the methyl methacrylate polymer (C-1) is not especially limited, but in view of impact resistance and heat resistance, 20% or more of syndiotacticity is preferable, 30% or more is more preferable, 40% or more is still more preferable. The upper limit is not especially limited, but in view of moldability, 90% or less is preferable. And in view of heat resistance, heterotacticity of 50% or less is preferable, 40% or less is more preferable, 30% or less is still more preferable. Furthermore, in view of heat resistance, isotacticity of 20% or less is preferable, 15% or less is more preferable, and 10% or less is still more preferable. The syndiotacticity, heterotacticity and isotacticity mentioned here are the values calculated from integrated intensity ratio of methyl group of linear branch measured by 1H-NMR using deuterium chloroform as solvent In the present invention, as producing method for methyl methacrylate polymer (C-1), publicly known polymerization methods such as bulk polymerization, solution polymerization, suspension polymerization and emulsion polymerization, can be applied.

The vinyl-based polymer to which 3 wt % or more of unsaturated carboxylic acid glycidyl ester unit or unsaturated dicarboxylic anhydride unit is copolymerized (C-2) is a vinyl-based polymer and/or copolymer to which 3 wt % or more of unsaturated carboxylic acid glycidyl ester unit or unsaturated dicarboxylic anhydride unit is copolymerized, but it does not include a rubbery polymer to which 3 wt % or more of unsaturated carboxylic acid glycidyl ester unit or unsaturated dicarboxylic anhydride unit is grafted. The rubbery polymer to which 3 wt % or more of unsaturated carboxylic acid glycidyl ester unit or unsaturated dicarboxylic anhydride unit is copolymerized is included in the rubbery polymer (E) mentioned later.

In the present invention, in view of impact resistance and heat resistance, it is preferable to be a vinyl-based polymer copolymerized with 3 wt % or more of unsaturated carboxylic acid glycidyl ester unit or unsaturated dicarboxylic anhydride unit, more preferable to be copolymerized with 6 wt % or more and still more preferable to be copolymerized with 9 wt % or more. As the upper limit, in view of flowability, it is preferable to be a vinyl-based polymer copolymerized 90 wt % or less, more preferable to be copolymerized with 40 wt % or less, still more preferable to be copolymerized with 20 wt % or less, and especially preferable to be copolymerized with 15 wt % or less.

In the present invention, as the unsaturated carboxylic acid glycidyl ester monomers, glycidyl acrylate, glycidyl methacrylate, glycidyl ethacrylate, glycidyl itaconate, etc., are mentioned, and as the unsaturated dicarboxylic anhydrides, maleic anhydride, itaconic anhydride, citraconic anhydride, 5-norbornene-2,3-dicarboxylic anhydride, 1-cyclohexene-1,2-dicarboxylic anhydride, cis-4-cyclohexene-1,2-dicarboxylic anhydride, etc., are mentioned. Among them, in view of impact resistance, heat resistance, and productivity, as the unsaturated carboxylic acid glycidyl ester monomers, glycidyl acrylate and glycidyl methacrylate, and as the unsaturated dicarboxylic anhydride monomers, maleic anhydride and 5-norbornene-2,3-dicarboxylic anhydride are preferable. These can be used alone or in combination of two or more species.

As for the vinyl-based polymer to which 3 wt % or more of unsaturated carboxylic acid glycidyl ester unit or unsaturated dicarboxylic anhydride unit is copolymerized (C-2) of the present invention, other vinyl-based monomers than the unsaturated carboxylic acid glycidyl ester unit or unsaturated dicarboxylic anhydride unit, it is not especially limited as far as it is copolymerizable with the unsaturated carboxylic acid glycidyl ester unit or unsaturated dicarboxylic anhydride unit, for example, unsaturated carboxylic acid alkyl ester monomer unit such as methyl (meth)acrylic, ethyl (meth) acrylate, n-propyl (meth)acrylate, n-butyl (meth)acrylate, t-butyl (meth)acrylate, n-hexyl (meth)acrylate, cyclohexyl (meth)acrylate, 2-ethylhexyl (meth)acrylate, chloromethyl (meth)acrylate, 2-chloroethyl (meth)acrylate, 2-hydroxyethyl (meth)acrylate, 3-hydroxypropyl (meth)acrylate, 2,3,4,5,6-pentahydroxyhexyl (meth)acrylate and 2,3,4,5-tetrahydroxypentyl (meth)acrylate, aromatic vinyl-based monomers such as styrene, α-methylstyrene, o-methylstyrene, p-methylstyrene, o-ethylstyrene, p-ethylstyrene and p-t-butylstyrene, vinyl cyanide-based monomers such as acrylonitrile, methacrylonitrile and ethacrylonitrile, maleimide-based monomers such as N-methyl maleimide, N-ethyl maleimide, N-cyclohexyl maleimide and N-phenyl maleimide, vinyl-based monomers having hydroxyl group such as acrylic acid, methacrylic acid, maleic acid, maleic acid monoethyl ester, 3-hydroxy-1-propene, 4-hydroxy-1-butene, cis-4-hydroxy-2-butene, trans-4-hydroxy-2-butene, 3-hydroxy-2-methyl-1-propene, cis-5-hydroxy-2-pentene, trans-5-hydroxy-2-pentene, 4,4-dihydroxy-2-butene, vinyl-based monomers having epoxy group such as allylglycidylether, styrene-p-glycidylether and p-glycidyl styrene, vinyl-based monomers having amino group or their derivative such as acrylamide, methacrylamide, N-methyl acrylamide, butoxymethyl acrylamide, N-propyl methacrylamide, aminoethyl acrylate, propylaminoethyl acrylate, dimethylaminoethyl methacrylate, ethyaminopropyl methacrylate, phenylaminoethyl methacrylate, cyclohexylaminoethyl methacrylate, N-vinyl diethylamine, N-acetyl vinylamine, allylamine, methallylamine, N-methyl allylamine and p-aminostyrene, vinyl-based monomer having oxazoline group such as 2-isopropenyl oxazoline, 2-vinyl oxazoline, 2-acroyl oxazoline and 2-styryl oxazoline, etc., are mentioned and these can be used alone or in combination of two or more species.

In the present invention, the weight average molecular weight of the vinyl-based polymer to which 3 wt % or more of unsaturated carboxylic acid glycidyl ester unit or unsaturated dicarboxylic anhydride unit is copolymerized (C-2) is not especially limited, but in view of impact resistance and heat resistance, it is preferable to be in the range of 1,000 to 450,000, more preferably in the range of 3,000 to 100,000, still more preferably in the range of 5,000 to 10,000. The weight average molecular weight mentioned here is the weight average molecular weight measured by gel permeation chromatography (GPC) using hexafluoroisopropanol as solvent and converted to that of polymethyl methacrylate (PMMA).

In the present invention, glass transition temperature (Tg) of the vinyl-based polymer to which 3 wt % or more of unsaturated carboxylic acid glycidyl ester unit or unsaturated dicarboxylic anhydride unit is copolymerized (C-2) is not especially limited, but in view of heat resistance, −50° C. or higher is preferable, 0° C. or higher is more preferable, 50° C. or higher is still more preferable, 70° C. or higher is particularly preferable and 90° C. or higher is most preferable. The upper limit is not limited, but in view of moldability, 150° C. or lower is preferable. The Tg mentioned here is the Tg determined by measurement by differential scanning calorimeter (DSC) and is the temperature at which specific heat capacity change in the Tg region becomes a half value.

In the present invention, as producing method for the vinyl-based polymer to which 3 wt % or more of unsaturated carboxylic acid glycidyl ester unit or unsaturated dicarboxylic anhydride unit is copolymerized (C-2), publicly known polymerization methods such as bulk polymerization, solution polymerization, suspension polymerization and emulsion polymerization, can be applied.

The graft polymer in which 20 to 90 wt % of methyl methacrylate unit is graft polymerized to 10 to 80 wt % of a rubbery polymer (C-3) can be obtained by providing, in the presence of 10 to 80 wt % of a rubbery polymer, a monomer mixture of 20 to 90 wt % of methyl methacrylate unit and a copolymerizable monomer added to publicly known polymerization such as bulk polymerization, solution polymerization, suspension polymerization or emulsion polymerization.

And, the graft polymer in which 20 to 90 wt % of methyl methacrylate unit is graft polymerized to 10 to 80 wt % of a rubbery polymer (C-3) includes a polymer in which a copolymer containing 20 to 90 wt % of methyl methacrylate unit is graft polymerized to 10 to 80 wt % of the rubbery polymer and a polymer in which the copolymer containing 20 to 90 wt % of methyl methacrylate unit has a non-graft structure with 10 to 80 wt % of the rubbery polymer (r).

Concretely, the rubbery polymer is not especially limited as far as it is a vinyl-based graft polymer obtained by copolymerizing 20 to 90 wt % of methyl methacrylate unit in the presence of 10 to 80 wt % of a rubbery polymer, but in view of impact resistance and heat resistance, a vinyl-based graft copolymer obtained by copolymerizing 20 to 90 wt % methyl methacrylate, 0 to 70 wt % aromatic vinyl-based unit, 0 to 50 wt % vinyl cyanide-based monomer and 0 to 70 wt % of other vinyl-based unit copolymerizable with them in the present of 10 to 80 wt % of a rubbery polymer.

As the above-mentioned rubbery polymer, although it is not especially limited, a rubbery polymer with its glass transition temperature of 0° C. or lower is preferable, and diene-based rubber, acryl-based rubber, ethylene-based rubber, organosiloxane-based rubber, etc., can be used. As examples of these rubbery polymer, polybutadiene, styrene-butadiene copolymer, styrene-butadiene block copolymer, acrylonitrile-butadiene copolymer, butyl acrylate-butadiene copolymer, polyisoprene, butadiene-methyl methacrylate copolymer, butyl acrylate-methyl methacrylate copolymer, butadiene-ethyl acrylate copolymer, ethylene-propylene copolymer, ethylene-propylene-diene-based copolymer, ethylene-isoprene copolymer, ethylene-methyl acrylate copolymer and polyorganosiloxane-acryl-based copolymer containing polyorganosiloxane and alkyl (meth)acrylate rubber, are mentioned. Among these rubbery polymers, in particular, in view of impact resistance, polybutadiene, styrene-butadiene copolymer, styrene-butadiene block copolymer, acrylonitrile-butadiene copolymer, butyl acrylate-methyl methacrylate copolymer and polyorganosiloxane-acryl-based copolymer is preferable, and they can be used alone or a mixture of two or more species.

The weight average particle diameter of the rubbery polymer constituting the graft polymer in which 20 to 90 wt % of methyl methacrylate unit is graft polymerized to 10 to 80 wt % of a rubbery polymer (C-3) of the present invention is not especially limited, but in view of impact resistance, it is preferable to be in the range of 0.05 to 1.0 μm and more preferable to be in the range of 0.1 to 0.5 μm. By adjusting the weight average particle diameter of the rubbery polymer to 0.05 to 1.0 μm, an excellent impact resistance can be exhibited.

Here, the weight average particle diameter can be determined by, making use of the fact that particle diameter of polybutadiene to be creamed varies depending on sodium alginate concentration, the sodium alginate method described in "Rubber Age, Vol. 88, p. 484 to 490, (1960), by E. Schmidt, P. H. Biddison", namely, a method for measuring a particle diameter at integrated weight percentage of 50%, based on creamed weight percentage and the sodium alginate concentration. As the rubbery polymer, it may be used alone or in combination of two or more species. And in view of impact resistance and flowability, it is preferable to use two or more kinds of the rubbery polymers have a small weight average particle diameter and a large weight average particle diameter, like so-called bimodal rubbery polymer.

In the present invention, the monomer copolymerizable with methyl methacrylate used for the graft polymer in which 20 to 90 wt % of methyl methacrylate unit is graft polymerized to 10 to 80 wt % of a rubbery polymer (C-3) is not especially limited, and for example, acrylic acid, methyl acrylate, ethyl acrylate, butyl acrylate, cyclohexyl acrylate, 2-ethylhexyl acrylate, allyl acrylate, aminoethyl acrylate, propylaminoethy acrylate, 2-hydroxyethyl acrylate, 2-hydroxypropyl acrylate, dicyclopentenyloxyethyl acrylate, dicyclopentanyl acrylate, butanediol diacrylate, nonanediol diacrylate, polyethylene glycol diacrylate, methyl 2-hydroxymethylacrylate, ethyl 2-hydroxymethylacrylate, methacrylic acid, ethyl methacrylate, butyl methacrylate, cyclohexyl methacrylate, 2-ethylhexyl methacrylate, dimethylaminoethyl methacrylate, ethylaminopropyl methacrylate, phenylaminoethyl methacrylate, cyclohexylaminoethyl methacrylate, 2-hydroxyethyl methacrylate, 2-hydroxypropyl methacrylate, dicyclopentenyloxyethyl methacrylate, dicyclopentanyl methacrylate, pentamethylpiperidyl methacrylate, tetramethylpiperidyl methacrylate, allyl methacrylate, benzyl methacrylate, ethylene glycol dimethacrylate, propylene glycol dimethacrylate, polyethylene glycol dimethacrylate, etc., are mentioned, and one or more of these species can be used. In addition, other vinyl-based monomer can be copolymerized, and as those other vinyl-based monomers, aromatic vinyl-based monomers such as styrene, α-methylstyrene, o-methylstyrene, p-methylstyrene, o-ethylstyrene, p-ethylstyrene and p-t-butylstyrene, vinyl cyanide-based monomers such as acrylonitrile, methacrylonitrile and ethacrylonitrile, vinyl-based monomers having epoxy group such as glycidyl acrylate, glycidyl methacrylate, glycidyl ethacrylate, glycidyl itaconate, allyl glycidyl ether, styrene-p-glycidyl ether, p-glycidyl styrene, N-substituted maleimide monomers such as maleic acid monoethyl ester, itaconic acid, vinylacetate, N-methyl maleimide, N-ethyl maleimide, N-cyclohexyl maleimide and N-phenyl maleimide, vinyl-based monomers having carboxyl group or carboxylic anhydride, such as maleic anhydride, phthalic acid and itaconic acid, vinyl-based monomers having amino group or its derivative such as acrylamide, methacrylamide, N-methyl acrylamide, butoxymethyl acrylamide, N-propyl methacrylamide, N-vinyl diethylamine, N-acetyl vinylamine, allylamine, methallylamine, N-methyl allylamine, p-aminostyrene, vinyl-based monomer having oxazoline group such as 2-isopropenyl-oxazoline, 2-vinyl oxazoline, 2-acroyl oxazoline and 2-styryl oxazoline, are mentioned, and in view of impact resistance and heat resistance, aromatic vinyl-based monomers and vinyl cyanide-based monomers are preferable, and one or more species of these can be used. Here, in the graft polymer in which 20 to 90 wt % of methyl methacrylate unit is graft polymerized to 10 to 80 wt % of a rubbery polymer (C-3) of the present invention, as other copolymerizable vinyl-based monomers, glycidyl esters of unsaturated carboxylic acid such as glycidyl acrylate, glycidyl methacrylate, glycidyl ethacrylate and glycidyl itaconate, or unsaturated dicarboxylic anhydrides such as maleic anhydride, itaconic anhydride and citraconic anhydride, may be copolymerized, but in view of flowability, the copolymerization ratio of the glycidyl ester of unsaturated carboxylic acid or the unsaturated carboxylic anhydride is less than 3 wt %. Those copolymerized with 3 wt % or more of the glycidyl ester of unsaturated carboxylic acid or the unsaturated carboxylic anhydride are included the vinyl-based polymer (C-2) mentioned above.

In the present invention, the aromatic vinyl-based monomer used for the graft polymer in which 20 to 90 wt % of methyl methacrylate unit is graft polymerized to 10 to 80 wt % of a rubbery polymer (C-3) is not especially limited, and for example, styrene, α-methylstyrene, o-methylstyrene, p-methylstyrene, o-ethylstyrene, p-ethylstyrene and p-t-butylstyrene, are mentioned, but among them, styrene and α-methylstyrene are preferably used. These can be used alone or in combination of two or more species.

In the present invention, the vinyl cyanide-based monomer used for the graft polymer in which 20 to 90 wt % of methyl methacrylate unit is graft polymerized to 10 to 80 wt % of a rubbery polymer (C-3) is not especially limited, and for example, acrylonitrile, methacrylonitrile and ethacrylonitrile are mentioned, but among them, acrylonitrile is preferably used. These can be used alone or in combination of two or more species.

In the present invention, the graft polymer in which 20 to 90 wt % of methyl methacrylate unit is graft polymerized to 10 to 80 wt % of a rubbery polymer (C-3) can be obtained by copolymerizing 20 to 90 wt %, more preferably 30 to 70 wt % of methyl methacrylate unit in the presence of 10 to 80 wt %, more preferably 30 to 70 wt % of a rubbery polymer, but in view of impact resistance and heat resistance, it is obtained by copolymerizing 0 to 70 wt %, more preferably 0 to 50 wt % of aromatic vinyl-based unit, 0 to 50 wt %, more preferably, 0 to 30 wt % of vinyl cyanide-based monomer and 0 to 70 wt %, more preferably, 0 to 50 wt % of other vinyl-based unit copolymerizable with them. It is not preferable that the ratio of the rubbery polymer is less than the above-mentioned range or more than the above-mentioned range, since impact strength or surface appearance may worsen.

Here, the graft polymer in which 20 to 90 wt % of methyl methacrylate unit is graft polymerized to 10 to 80 wt % of a rubbery polymer (C-3) contains non-grafted copolymer other than the graft polymer in which a monomer or a monomer mixture is grafted to a rubbery polymer. The graft ratio of the graft polymer is not especially limited, but in order to obtain a resin composition excellent in impact resistance and glossiness in good balance, it is preferably in the range of 10 to 100 wt %, especially, 20 to 80 wt %. Here, the graft ratio is the value calculated by the following formula.

Graft ratio (%)=[(content of vinyl-based copolymer grafted to rubbery polymer)/(rubber content of graft copolymer)]×100

The characteristic of the non-grafted copolymer is not especially limited, but in view of impact resistance, the intrinsic viscosity [η] (measured at 30° C.) of soluble component in methyl ethyl ketone is preferably in the range of 0.10 to 1.00 dl/g, in particular, 0.20 to 0.80 dl/g.

The graft polymer in which 20 to 90 wt % of methyl methacrylate unit is graft polymerized to 10 to 80 M % of a rubbery polymer (C-3) can be obtained by a publicly known method. For example, it can be obtained by a method such as, in the presence of a rubbery polymer latex, continuously feeding a mixture of a monomer and a chain transfer agent, and a solution of a radical initiator dissolved in a emulsifying agent, into a polymerization vessel to thereby carry out emulsion polymerization.

The block copolymer in which a polylactide segment represented by the above-mentioned general formula (I) and a vinyl-based polymer segment represented by the above-mentioned general formula (II) are bonded in a copolymerization ratio, (((I)/(II)), of 99/1 to 1/99 wt parts (here, (I)+(II)=100 wt parts) (C-4) is a block copolymer in which the polylactide segment (A) and the vinyl-based polymer segment represented by the above-mentioned general formula (II) (B) is connected.

The polylactide segment in the block copolymer of the present invention comprises the structural unit represented by the above-mentioned general formula (I), and it is a polymer of L-lactic acid and/or D-lactic acid as main monomer components, but it may also contain other copolymerization component than lactic acid. As the other monomer units, glycol compounds such as ethylene glycol, propylene glycol, butane diol, heptane diol, hexane diol, octane diol, nonane diol, decane diol, 1,4-cyclohexane dimethanol, neopentyl glycol, glycerin, pentaerythritol, bisphenol A, polyethylene glycol, polypropylene glycol and polytetramethylene glycol, dicarboxylic acids such as oxalic acid, adipic acid, sebacic acid, azelaic acid, dodecane dionic acid, malonic acid, glutaric acid, cyclohexane dicarboxylic acid, terephthalic acid, isophthalic acid, phthalic acid, naphthalene dicarboxylic acid, bis (p-carboxyphenyl)methane, anthracene dicarboxylic acid, 4,4'-diphenyl ether dicarboxylic acid, 5-sodium sulfoisophthalic acid and 5-tetrabutyl phosphonium isophthalic acid, hydroxycarboxylic acids such as glycolic acid, hydroxypropionic acid, hydroxylactic acid, hydroxyvaleric acid, hydroxycaproic acid, hydroxybenzoic acid, lactones such as caprolactone, valerolactone, propiolactone, undecalactone and 1,5-oxepan-2-one, can be mentioned. The copolymerization ratio of the above-mentioned other copolymerization component, based on the total monomer component, is preferably 0 to 30 mol %, and 0 to 10 mol % is preferable.

In the present invention, in order to obtain a resin composition having particularly high heat resistance, it is preferable to use a lactic acid component of high optical purity for the polylactic acid segment. It is preferable that, in total lactic acid component of the polylactic acid segment, L-type is contained 80 mol % or more or D-type is contained 80 mol % or more, and it is more preferable that L-type is contained 90 mol % or more or D-type is contained 90 mol % or more and it is especially preferable that L-type is contained 95 mol % or more or D-type is contained 95 mol % or more.

As production methods of polylactic acid segment, publicly known methods can be applied and methods such as direct polymerization from lactic acid or ring-open polymerization via lactide, can be mentioned.

As for m (number average molecular weight) of polylactic acid segment used in the present invention, in order to maintain compatibility improving effect or mechanical properties, it is preferably 1,000 to 100,000, more preferably, 1,000 to 50,000. Here, the m (number average molecular weight) of polylactic acid segment is the value calculated from the ratio of main chain and end group of the spectrum obtained by 1H-NMR measurement. The polylactic acid segment is dissolved in deuterium chloroform solvent and structural repeating unit is determined from the ratio of the areas of the peak near 5.2 ppm based on CH in main chain and of the peak near 4.6 ppm based on CH at end groups to thereby determine the number average molecular weight. The average molecular weight of the polylactic acid segment can be determined by measuring the molecular weight of starting material before preparing the copolymer, but by measuring 1H-NMR, it is also possible to determine the number average molecular weight.

Next, vinyl-based polymer segment represented by the above-mentioned general formula (II) consists of the structure represented by the general formula (II), and in the general formula (II), X is at least one selected from hydrogen, alkyl group, hydroxyl group, alkyl ester group, cyano group, phenyl group and amide group. Here, the number of carbons of alkyl group or alkyl ester group is preferably 1 to 12, and more preferably 1 to 6.

As representative vinyl-based polymer segments, polyethylene, ethylene-vinylacetate copolymer, ethylene-glycidyl methacrylate copolymer, ethylene-dimethylaminoethyl methacrylate copolymer, ethylene-maleic anhydride copolymer, ethylene-carbon monoxide copolymer, ethylene-ketene acetal copolymer, ethylene-vinyl oxirane copolymer, ethylene-dioxolane copolymer, ethylene-styrene copolymer, ethylene-vinyl alcohol copolymer, polyvinyl chloride, vinyl chloride-vinyl acetate copolymer, ethylene-vinyl chloride copolymer, polystyrene, polyacrylonitrile, styrene-acrylonitrile copolymer, acrylonitrile-methyl acrylate copolymer, acrylonitrile-vinylacetate copolymer, acrylonitrile-vinyl chloride copolymer, acrylonitrile-methyl methacrylate copolymer, vinyl acetate, polyvinyl alcohol, polymethyl methacrylate, polyacrylamide, polyvinylidene chloride, etc., are mentioned, and these copolymers and/or their derivatives can be used alone or in combination of two or more species. Among them, especially preferable are polystyrene, styrene-acrylonitrile copolymer and polymethyl methacrylate.

As for n (number average molecular weight) of the vinyl-based polymer segment used in the present invention, in order to maintain compatibility improving effect or mechanical properties, it is preferably 1,000 to 100,000, more preferably, 1,000 to 50,000. Here, the n (number average molecular weight) of the vinyl-based polymer segment is the value of number average molecular weight measured by gel permeation chromatography (GPC) and converted to that of the standard polystyrene or the standard polymethyl methacrylate (PMMA).

As for the producing method of the block copolymer (C-4) of the present invention, it can be produced by, after fusing a compound in which one or more hydroxyl groups are contained at the end or on a side chain of the vinyl-based polymer segment represented by the above-mentioned general formula (II) into lactide, applying a ring-opening polymerization using a publickly known ring-opening polymerization catalyst. Here, however, in order to carry out the block copolymerization quantitatively, it is preferable that the compound having one or more hydroxyl groups at the ends or on the side chain is fusible into lactide.

Here, the production method of the compound having one or more hydroxyl group at the ends or on the side chain is not especially limited, but random copolymerization, block copolymerization or graft copolymerization with a monomer having a hydroxyl group or a method in which a monomer represented by the following general formula (III) is polymerized by radical polymerization and its ends are blocked with a chain transfer agent containing hydroxyl group, is applied.

[Formula 3]

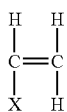

(III)

(X denotes at least one species selected from hydrogen, an alkyl group, hydroxyl group, an alkyl ester group, cyano group, phenyl group, amide group and a halogen group.)

Furthermore, as radical polymerization methods, suspension polymerization, emulsion polymerization, solution polymerization, etc., are mentioned. In such polymerizations, usually, an initiator is used and publickly known initiator can be used, but a radical polymerization initiator can be preferably used. Furthermore, in order to polymerize in a living way, it is possible to use a living radical initiator.

As representative radical polymerization initiators, benzoin-based compounds such as benzoin and methyl benzoin, acetophenone-based compounds such as acetophenone and 2,2-dimethoxy-2-phenyl acetophenone, thioxanthone-based compounds such as thioxanthone and 2,4-diethyl thioxanthone, bis azide compounds such as 4,4'-diazidechalcone, 2,6-bis(4'-azidebenzal)cyclohexanone and 4,4'-diazidbenzophenone, azo compounds such as azobisisobutyronitrile, 2,2-azobispropane, m,m'-azoxystyrene and hydrazone, organic peroxides such as 2,5-dimethyl-2,5-di(t-butylperoxy)hexane, 2,5-dimethyl-2,5-di(t-butylperoxy)hexine-3, dicumyl peroxide and benzoyl peroxide, etc., are mentioned.

As polymerization method using a living radical polymerization initiator, publicly known methods can be applied. For example, a method using a nitroxy radical represented by 2,2,6,6-tetramethyl-1-piperidinyloxy (TEMPO), a method using a compound having a carbon-iodide bond and a radical polymerization initiator, and a polymerization method using a polymerization catalyst consisting of halogenated hydrocarbon or halogenated sulfonyl compound and an activator consisting of metal complex and Lewis acid, etc., are mentioned.

As the chain transfer agent containing hydroxyl group used for blocking molecular ends, for example, mercaptoethanol, mercaptobutanol, mercaptopropanol, mercaptobenzoyl alcohol, mercaptohexanol, mercaptoundecanol and mercaptophenol are mentioned, and mercaptoethanol, mercaptobutanol, mercaptopropanol, mercaptohexanol, mercaptoundecanol, etc., are preferably used.

The block copolymer (C-4) of the present invention can be produced, as mentioned above, after fusing a compound having one or more hydroxyl groups at molecular ends or on side chain into lactide, by a ring-opening polymerization using a publickly known ring-opening polymerization catalyst. As the ring-opening polymerization catalysts used here, metals such as tin, zinc, lead, titanium, bismuth, zirconium, germanium, antimony and aluminum, and their derivatives are mentioned. As the derivatives, metal alkoxides, carboxylic acid salt, carbonic acid salt, oxide, halogenated compound are preferable. Concretely, tin chloride, tin octylate, zinc chloride, zinc acetate, lead oxide, lead carbonate, titanium chloride, titanium alkoxides, germanium oxide, zirconium oxide, etc., are mentioned. Among them, tin-based compound is preferable and tin octylate is especially preferable.

In the present invention, as the compatibilizer (C), for example, "Arufon", "Joncryl", "Kraton", "Tuftec", "Modiper", "Reseda", "Bondfast", "Bondine", "Tafmer", "Umex", "Bennet" can be used.

The amount of the ring-opening polymerization catalyst to be added is not especially limited, but 0.001 to 2 wt parts per total weight of lactide and the starting material (F) to be used is preferable, and 0.001 to 1 wt part is more preferable. If the amount of the catalyst is less than 0.001 wt part, shortening effect of polymerization time is lowered, and if it is more than 2 wt parts, a high molecular block may not be obtained.

Furthermore, in order to obtain a block copolymer of high block ratio, it is preferable to dry the compound having one or more hydroxyl groups at molecular ends or on side chain beforehand to remove water. In addition, it is also preferable to provide the compound having one or more hydroxyl groups at molecular ends or on side chain to the block copolymerization after fusing it into lactide. The fusing temperature depends on the amounts of the compound having one or more hydroxyl groups at molecular ends or on side chain and the lactide to be used, but it is usually 60 to 150° C., and preferably, 80 to 140° C., and more preferably 100 to 140° C.

The reaction vessel used at producing the block copolymer (C-4) of the present invention is not especially limited, but mixer type reactor, column type reactor, and extruder type reactor, etc., can be used. The reactors can be used in combination of two or more types.

The polymerization temperature is not especially limited, but the range of 60 to 250° C. is preferable.

Here, because this polymerization reaction is preferably carried out in a fused condition, it is also preferable to react at the melting temperature or higher of the polymer to melt it, but in view of preventing pyrolysis reaction, it is preferable to carry out the reaction as low temperature as possible to the extent such that the reactant would not solidify.

The reaction pressure of each step is not especially limited, and it may be any one of a reduced pressure, normal pressure and an increased pressure.

Moreover, in each step, it is preferable to keep the reaction system as dry as possible. It is effective to achieve a high polymerization degree and a high block ratio of the obtained block copolymer that lactide, the starting material, or the compound having one of more hydroxyl groups at molecular ends or on side chain is dried or that they are reacted under de-nitrogen atmosphere.

It is preferable to purify the polymer after the end of polymerization, so that no unreacted monomer remains. The purifying method is not especially limited, but for example, a method in which the polymer is dissolved in a solvent which dissolves the block copolymer such as chloroform and after that, the solution is poured into a solvent which does not dissolve the block copolymer such as methanol and is precipitated, or the like can be applied.

In the block copolymer (C-4) of the present invention, the ratio of the polylactide segment represented by general formula (I) and vinyl-based polymer segment represented by general formula (II) is 99 to 1/1 to 99 wt parts (here, (I)+(II) are 100 wt parts), and preferably 80 to 20/20 to 80 wt parts, still more preferably 70 to 30/30 to 70 wt parts.

When only the polylactide segment and the vinyl-based polymer segment are melt-blended in the above-mentioned range, both polymers only distribute roughly and, depending on the type of the vinyl-based polymer, melt-blending becomes impossible. However, by the block copolymer in which the polylactide segment and the vinyl-based polymer segment are bonded, compatibility was attained and it was found that characteristics such as mechanical properties, heat resistance and transparency which cannot be attained by polylactide only, can be improved.

In the present invention, dicarboxylic anhydride (D) means a compound having a structure in which water molecule is intramolecularly removed from dicarboxylic acid, for example, maleic anhydride, itaconic anhydride, citraconic anhydride, 5-norbornene-2,3-dicarboxylic anhydride, 1-cyclohexene-1,2-dicarboxylic anhydride, cis-4-cyclohexene-1, 2-dicarboxylic anhydride, succinic anhydride, adipinic anhydride, cyclohexane dicarboxylic anhydride, phthalic anhydride, etc., are mentioned, and in view of impact resistance, heat resistance and moldability, any one or more of maleic anhydride and succinic anhydride is preferable, and in view of impact resistance or heat resistance, maleic anhydride or succinic anhydride is more preferable, and maleic anhydride is still more preferable. And, in the resin composition of the present invention, the dicarboxylic anhydride (D) may be present as a simple compound, or, as a compound without anhydride structure by reacting with any one or more of the styrene resin (A), the aliphatic polyester (B) and the compatibilizer (C). In the present invention, it is estimated that, by compounding the dicarboxylic anhydride (D), the morphology of the styrene resin (A), the aliphatic polyester (B) and the compatibilizer (C) is affected and the characteristics such as strength, impact resistance, heat resistance and moldability are greatly improved.

In the present invention, as for the compounding ratios of the styrene resin (A), the aliphatic polyester (B), based on 100 wt parts in total of the styrene resin (A) and the aliphatic polyester (B), the compounding ratio of the styrene-based resin (A) is 5 wt parts or more, and in view of impact resistance and heat resistance, it is preferably 10 wt parts or more, more preferably 25 to 80 wt parts, still more preferably 30 to 70 wt parts, and the aliphatic polyester (B) is 1 to 95 wt parts, and in view of impact resistance and heat resistance, it is preferably 7 to 50 wt parts, more preferably 10 to 50 wt parts. Moreover, the amount of the aliphatic polyester (B) to be added is less than 85 wt parts, preferably 65 to 10 wt parts, still more preferably, in the range of 50 to 10 wt parts.

In the present invention, as for the compounding amount of the compatibilizer (C), based on 100 wt parts in total of the styrene resin (A) and the aliphatic polyester (B), the amount of the methyl methacrylate polymer (C-1) is 0.1 to 30 wt parts, and in view of impact resistance and heat resistance, it is more preferably 2 to 15 wt parts, still more preferably 2 to 10 wt parts; and the amount to be added of the vinyl-based polymer to which 3 wt % or more of unsaturated carboxylic acid glycidyl ester unit or unsaturated dicarboxylic anhydride unit is copolymerized (C-2) is 0.01 to 35 wt parts, and in view of impact resistance and heat resistance, it is preferably 0.1 to 20 wt parts, more preferably 0.2 to 10 wt parts; and the amount to be added of the graft polymer in which 20 to 90 wt % of methyl methacrylate unit is graft polymerized to 10 to 80 wt % of a rubbery polymer (C-3) is 1 to 60 wt parts, and in view of impact resistance and heat resistance, it is preferably 2 to 50 wt parts, more preferably 5 to 35 wt parts; and the amount to be added of the block copolymer in which a polylactide segment represented by the general formula (I) and a vinyl-based polymer segment represented by the general formula (II) are bonded in a copolymerization ratio, ((I)/(II)), of 99/1 to 1/99 wt parts (here, (I)+(II)=100 wt parts) (C-4) is 0.05 to 20 wt parts, and in view of impact resistance and heat resistance, it is preferably 0.1 to 15 wt parts, more preferably 1 to 10 wt parts;

In the present invention, the compounding amount of the dicarboxylic anhydride (D) is, based on 100 wt parts in total of the styrene resin (A) and the aliphatic polyester (B), 0 to 5 wt parts, and in view of impact resistance and heat resistance, it is preferably 0.05 to 2 wt parts or more, more preferably 0.1 to 1 wt part.

The resin composition of the present invention has the above-mentioned composition and can be obtained by mixing the styrene-based resin (A) and the aliphatic polyester resin (B), and at least one species selected from the compatibilizer (C) and the dicarboxylic anhydride (D), but by making the obtained resin composition in the range of, based on the resin composition, unsaturated carboxylic acid alkyl ester-based unit 1 to 90 wt %, preferably 10 to 80 wt %, the aromatic vinyl-based unit 0.1 to 80 wt %, preferably 1 to 70 wt %, vinyl cyanide based unit 0 to 45 wt %, preferably 0 to 40 wt %, other vinyl-based unit copolymerizable with these components 0 to 85 wt %, preferably 0 to 80 wt %, a sufficient impact resistance and heat resistance can be obtained.

Furthermore, in the present invention, it is preferable to compound the rubbery polymer (E).

In the present invention, the rubbery polymer (E) is not especially limited, but a rubbery polymer with a glass transition temperature of 0° C. or lower is preferable, and diene-based rubber, acryl-based rubber, ethylene-based rubber, organosiloxane-based rubber or the like can be used. As examples of these rubbery polymer, polybutadiene, styrene-butadiene copolymer, styrene-butadiene block copolymer, acrylonitrile-butadiene copolymer, butyl acrylate-butadiene copolymer, polyisoprene, butadiene-methyl methacrylate copolymer, butyl acrylate-methyl methacrylate copolymer, butadiene-ethyl acrylate copolymer, ethylene-propylene copolymer, ethylene-propylene-diene-based copolymer, ethylene-isoprene copolymer, ethylene-methyl acrylate copolymer and polyorganosiloxane-acryl-based copolymer containing polyorganosiloxane and alkyl (meth)acrylate rubber, are mentioned. Among these rubbery polymers, especially in view of heat resistance, polybutadiene, styrene-butadiene copolymer, styrene-butadiene block copolymer, acrylonitrile-butadiene copolymer and polyorganosiloxane-acryl-based copolymer are preferable, and it is possible to use them alone or as a mixture of two or more species.

In the present invention, the rubbery polymer (E) is preferably graft polymerized with an aromatic vinyl-based unit and vinyl cyanide-based unit and a vinyl-based monomer copolymerizable with them may be copolymerized.

The aromatic vinyl-based monomer used for the rubbery polymer (E) of the present invention is not especially limited and aromatic vinyl-based monomers such as styrene, α-methylstyrene, o-methylstyrene, p-methylstyrene, o-ethylstyrene, p-ethylstyrene and p-t-butylstyrene, are mentioned and in view of heat resistance, styrene and α-methylstyrene are preferable.

The vinyl cyanide-based monomer used for the rubbery polymer (E) of the present invention is not especially limited, and vinyl cyanide-based monomers such as acrylonitrile, methacrylonitrile and ethacrylonitrile are mentioned, and in view of heat resistance and weather resistance, acrylonitrile is preferable.

The other copolymerizable monomers for the rubbery polymer (E) of the present invention is not especially limited, and for example, acrylic acid, methyl acrylate, ethyl acrylate, propyl acrylate, butyl acrylate, cyclohexyl acrylate, 2-ethylhexyl acrylate, ally acrylate, aminoethyl acrylate, propylaminoethy acrylate, 2-hydroxyethyl acrylate, 2-hydroxypropyl acrylate, dicyclopentenyloxyethyl acrylate, dicyclopentanyl acrylate, butanediol diacrylate, nonanediol diacrylate, polyethylene glycol diacrylate, methyl 2-hydroxymethylacrylate, ethyl 2-hydroxymethylacrylate, methacrylic acid, methyl methacrylate, ethyl methacrylate, propyl methacrylate, butyl methacrylate, cyclohexyl methacrylate, 2-ethylhexyl methacrylate, dimethylaminoethyl methacrylate, ethylaminopropyl methacrylate, phenylaminoethyl methacrylate, cyclohexylaminoethyl methacrylate, 2-hydroxyethyl methacrylate, 2-hydroxypropyl methacrylate, dicyclopentanyloxyethyl methacrylate, dicyclopentanyl methacrylate, pentamethylpiperidyl methacrylate, tetramethylpiperidyl methacrylate, allyl methacrylate, benzyl methacrylate, ethylene glycol dimethacrylate, propylene glycol dimethacrylate, polyethylene glycol dimethacrylate, etc., are mentioned, and one or more species of these can be used. In addition, other vinyl-based monomer can be copolymerized, and as those other vinyl-based monomers, vinyl-based monomers having an epoxy group such as glycidyl acrylate, glycidyl methacrylate, glycidyl ethacrylate, glycidyl itaconate, allyl glycidyl ether, styrene-p-glycidyl ether and p-glycidyl styrene, maleic acid monoethyl ester, itaconic acid, vinyl acetate, N-substituted maleimide monomers such as N-methyl maleimide, N-ethyl maleimide, N-cyclohexyl maleimide and N-phenyl maleimide, vinyl-based monomers having carboxyl group or carboxylic anhydride, such as maleic anhydride, itaconic anhydride, citraconic anhydride, phthalic acid and itaconic acid, vinyl-based monomers having amino group or its derivative such as acrylamide, methacrylamide, N-methyl acrylamide, butoxymethyl acrylamide, N-propyl methacrylamide, N-vinyl diethylamine, N-acetyl vinylamine, allyl amine, methallyl amine, N-methyl allylamine and p-aminostyrene, vinyl-based monomer having oxazoline group such as 2-isopropenyl-oxazoline, 2-vinyl oxazoline, 2-acroyl oxazoline and 2-styryl oxazoline, are mentioned, and in view of impact resistance and heat resistance, aromatic vinyl-based monomers and vinyl cyanide-based monomers and the vinyl-based monomers having aromatic group are preferable, and one or more species of these can be used. Here, in the present invention, those copolymerized with 3 wt % or more of glycidyl esters of unsaturated carboxylic acid unit such as glycidyl acrylate, glycidyl methacrylate, glycidyl ethacrylate, glycidyl itaconate or unsaturated carboxylic anhydrides such as maleic anhydride, itaconic anhydride and citraconic anhydride are not included in the rubbery polymer (E) and included in the vinyl-based polymer to which 3 wt % or more of unsaturated carboxylic acid glycidyl ester unit or unsaturated dicarboxylic anhydride unit is copolymerized (C-2). And, in the present invention, those in which 20 to 90 wt % methyl methacrylate unit is graft polymerized to 10 to 80 wt % of rubbery polymer are not included in the rubbery polymer (E) and included in the graft polymer in which 20 to 90 wt % of methyl methacrylate unit is graft polymerized to 10 to 80 wt % of a rubbery polymer (C-3).

The rubbery polymer (E) of the present invention can be obtained by copolymerizing, for example, in the presence of 10 to 80 wt % of a rubbery polymer in view of impact resistance, heat resistance and moldability, more preferably in the presence of 30 to 70 wt % in view of impact resistance, aromatic vinyl-based monomer unit 10 to 70 wt %, more preferably 10 to 50 wt % in view of impact resistance, vinyl cyanide-based monomer 10 to 50 wt %, more preferably, 10 to 30 wt % in view of impact resistance, and other vinyl-based monomer (excluding methyl methacrylate) copolymerizable with them 0 to 70 wt %, more preferably, 0 to 50 wt % in view of impact resistance. It is not preferable that the ratio of the rubbery polymer is less than the above-mentioned range or more than the above-mentioned range, since impact strength or surface appearance may worsen.

Here, it is preferable that the rubbery polymer (E) of the present invention is a graft polymer in which the aromatic vinyl-based unit, the vinyl cyanide-based monomer and the other monomer copolymerizable with them are graft polymerized to 10 to 80 wt % of a rubbery polymer, but it contains non-grafted copolymer other than a graft polymer in which a monomer or a monomer mixture is grafted to a rubbery polymer. The graft ratio of the graft polymer is not especially limited, but in order to obtain a resin composition excellent in impact resistance and glossiness in good balance, it is preferably in the range of 10 to 100 wt %, especially, 20 to 80 wt %. Here, the graft ratio is the value calculated by the following formula.

Graft ratio (%)=[(content of vinyl-based copolymer grafted to rubbery polymer)/(rubber content of graft copolymer)]×100

The characteristic of the non-grafted copolymer is not especially limited, but in view of impact resistance, the intrinsic viscosity [q] (measured at 30° C.) of soluble component in methyl ethyl ketone is preferably in the range of 0.10 to 1.00 dl/g, in particular, of 0.20 to 0.80 dl/g.

The rubbery polymer (E) of the present invention can be obtained by a publicly known method. For example, it can be obtained by a method such as, in the presence of a rubbery polymer latex, continuously feeding a mixture of a monomer and a chain transfer agent and a solution of a radical initiator dissolved in a emulsifying agent into a polymerization vessel to thereby carry out emulsion polymerization.

The weight average particle diameter of the rubbery polymer (E) of the present invention is not especially limited, but in view of impact resistance, it is preferable to be in the range of 0.05 to 1.0 μm and more preferable to be in the range of 0.1 to 0.5 μm. By controlling the weight average particle diameter of the rubbery polymer to 0.05 to 1.0 μm, an excellent impact resistance can be exhibited.

Here, the weight average particle diameter of the rubbery polymer (E) can be determined by the sodium alginate method described in "Rubber Age, Vol. 88, p. 484 to 490, (1960), by E. Schmidt, P. H. Biddison", namely, a method for measuring a particle diameter at integrated weight percentage of 50%, based on creamed weight percentage and the sodium alginate concentration, applying the fact that particle diameter of polybutadiene to be creamed varies depending on sodium alginate concentration. As the rubbery polymer, it may be used alone or in combination of two or more species. And in view of impact resistance and flowability, it is preferable to use two or more kinds of the rubbery polymers have a small weight average particle diameter and a large weight average particle diameter, like so-called bimodal rubbery polymer.

In the present invention, the compounding ratio of the rubbery polymer (E) is, based on 100 wt parts in total of the styrene-based resin (A) and the aliphatic polyester (B), 1 to 60 wt parts, and in view of impact resistance and heat resistance, it is preferably 2 to 40 wt parts, more preferably 5 to 35 wt parts.

In the present invention, when only the compatibilizer (C) is selected as at least one species selected from the compatibilizer (C) and the dicarboxylic anhydride (D), and the compatibilizer (C) is (C-2) or (C-3) component, it is preferable that, when total area of (C-2) and/or (C-3) in cross-sectional photomicrograph of the resin composition is put as 100%, the areal ratio of (C-2) and/or (C-3) in the aliphatic polyester (B) is 10 to 90%.

Moreover, in the present invention, in case where the rubbery polymer (E) is compounded, it is preferable that, when total area of (C-2), (C-3) and/or the rubbery polymer (E) in cross-sectional photomicrograph of the resin composition is put as 100%, the areal ratio of (C-2), (C-3) and/or the rubbery polymer (E) in the aliphatic polyester (B) is 10 to 90%

In the cross-sectional photomicrograph of the resin composition of the present invention, the resin composition is constituted by a matrix resin consisting of the styrene-based resin (A), the aliphatic polyester (B) and at least one or more dispersed phases selected from the vinyl-based polymer to which 3 wt % or more of unsaturated carboxylic acid glycidyl ester unit or unsaturated dicarboxylic anhydride unit is copolymerized (C-2), the graft polymer in which 20 to 90 wt % of methyl methacrylate unit is graft polymerized to 10 to 80 wt % of a rubbery polymer (C-3) and the rubbery polymer (E) dispersed in the matrix resin, and the areal ratio of these dispersed phases (C-2), (C-3) and (E) present in the aliphatic polyester (B) is in the range of 10 to 90%, and in view of impact resistance, heat resistance, moldability, appearance and coloration, the areal ratio is preferably present in the range of 20 to 85%, and is more preferably present in the range of 30 to 80%. If the areal ratio is not present in the range of 10 to 90%, it is not preferable since the impact resistance decreases significantly.

In the resin composition of the present invention, for example, as for a molded article obtained by an injection molding, for a sample in which the styrene-based resin (A), the vinyl-based polymer to which 3 wt % or more of unsaturated carboxylic acid glycidyl ester unit or unsaturated dicarboxylic anhydride unit is copolymerized (C-2), the graft polymer in which 20 to 90 wt % of methyl methacrylate unit is graft polymerized to 10 to 80 wt % of a rubbery polymer (C-3) and the rubbery polymer (E) are dyed by osmium block dyeing method and then an ultra-thin test piece is cut out, by observing the cross section magnified 6000 times with a transmission electron microscope, the dispersed morphology of (C-2), (C-3) and (E) can be confirmed.

In the present invention, it can be confirmed that, as for composition of the vinyl-based polymer to which 3 wt % or more of unsaturated carboxylic acid glycidyl ester unit or unsaturated dicarboxylic anhydride unit is copolymerized (C-2), for example, increasing the unsaturated carboxylic acid glycidyl ester unit or unsaturated dicarboxylic anhydride in the range such that the purpose of the invention is not spoiled, or, as for the composition of the graft polymer in which 20 to 90 wt % of methyl methacrylate unit is graft polymerized to 10 to 80 wt % of a rubbery polymer (C-3), for example, increasing the methyl methacrylate unit in the range such that the purpose of the invention is not spoiled, or, as for the composition of the rubbery polymer (E), for example, as the vinyl cyanide-based monomer unit or aromatic vinyl-based monomer, increasing the α-methyl styrene in the range such that the purpose of the invention is not spoiled, makes (C-2), (C-3) and (E) more dispersed in the phase of the aliphatic polyester (B). On the other hand, it can be confirmed that, as for the composition of the vinyl-based polymer to which 3 wt % or more of unsaturated carboxylic acid glycidyl ester unit or unsaturated dicarboxylic anhydride unit is copolymerized (C-2), for example, decreasing the unsaturated carboxylic acid glycidyl ester unit or unsaturated dicarboxylic anhydride in the range such that the purpose of the invention is not spoiled, or, as for the graft polymer in which 20 to 90 wt % of methyl methacrylate unit is graft polymerized to 10 to 80 wt % of a rubbery polymer (C-3), for example, decreasing the methyl methacrylate unit in the range such that the purpose of the invention is not spoiled, or, as for the rubbery polymer (E), for example, as the vinyl cyanide-based monomer unit or aromatic vinyl-based monomer in the mixture to be graft polymerized, decreasing the α-methyl styrene in the range such that the purpose of the invention is not spoiled, makes (C-2), (C-3) and (E) less dispersed in the phase of the aliphatic polyester (B), and more dispersed in the phase of the styrene-based resin (A).

In the present invention, for measuring the areal ratio of (C-2), (0-3) and (E) present in the polyester (B), the cross section photograph of the molded article was taken by a transmission electron microscope in the same way as above-mentioned. And further, the photograph was magnified 4 times and the area (X) of (C-2), (C-3) and (E) dispersed in the aliphatic polyester (B) and the area (Y) of (C-2), (C-3) and (E) dispersed in the styrene resin (A) were cut out from the photograph and determined by the weight method, and the ratio was determined by the formula, $(X)/((X)+(Y))$.

FIGS. 1 and 2 are modeled illustrations of the electron photomicrographs and 1 denotes the matrix component (A), 2 denotes the matrix component (B) and 3 denotes the dispersed phase. FIG. 1 is an example of the present invention and the dispersed phase 3 is constituted by (C-2), (C-3) or (E) and it is observed that they are also present in the matrix component (B) considerably. On the other hand, FIG. 2 is an example of a prior art and the dispersed phase 3 is constituted by the component (E) and the components (C-2), (C-3) are not present. In this case, it can be understood that the dispersed phase 3 is concentrated in the matrix 1, the component (A), and is not present in the matrix component (B).

Furthermore, in the present invention, in view of impact resistance, heat resistance, moldability, flowability and appearance, it is preferable to include one or more thermoplastic resin selected from a polycarbonate, an aromatic polyester, a polyimide, polyethylene, polypropylene and polyvinyl chloride (F).

As such a polycarbonate (F), it is not especially limited, and both of aromatic polycarbonates and aliphatic polycarbonates can be used, but in view of flame retardancy, an aromatic polycarbonate is preferable and in view of impact resistance, an aliphatic polycarbonate is preferable.

In the present invention, as the aromatic polycarbonate (F), aromatic polycarbonates such as homo- or co-polycarbonates obtainable by reacting aromatic bifunctional phenol with phosgene or carbonic diester are mentioned, and those of weight average molecular weight converted to that of polymethyl methacrylate (PMMA) determined by gel permeation chromatography (GPC) in the range of 5.000 to 500,000 are preferably used, and those of glass transition temperature determined by differential scanning calorimeter (DSC) in the range of 100 to 155° C. are preferably used.

In the present invention, the aliphatic polycarbonate (F) means those in which high molecular linear chain consists of an aliphatic hydrocarbon and carbonate group, and substituted side chain may not be an aliphatic hydrocarbon. Concretely, polyethylene carbonate, polypropylene carbonate, polycyclohexene carbonate and polystyrene carbonate are mentioned.

As the carbonate (F) of the present invention, in view of impact resistance, heat resistance, moldability and flame retardancy, polycarbonates containing a silicone compound and/or silicone copolymerized polycarbonate is preferable.

Such an aromatic polyester (F) is not especially limited, but as examples of aromatic polyester, polymers or copolymers obtainable by condensation reaction of an aromatic dicarboxylic acid (or its ester-formable derivative) and a diol (or its ester-formable derivative) as main components.

As the above-mentioned dicarboxylic acid, aromatic dicarboxylic acids such as terephthalic acid, isophthalic acid, phthalic acid, 2,6-naphthalene dicarboxylic acid, 1,5-naphthalene dicarboxylic acid, bis(p-carboxyphenyl)methane, anthracene dicarboxylic acid, 4,4'-diphenyl ether dicarboxylic acid, 5-sodium sulfoisophthalic acid are mentioned and to these aromatic dicarboxylic acids, it is possible to copolymerize aliphatic dicarboxylic acids, alicyclic dicarboxylic acids or their ester formable derivatives. As such aliphatic dicarboxylic acids, adipinic acid, sebacic acid, azelaic acid and dodecane dioic acid or the like are mentioned, and as alicyclic dicarboxylic acid, alicyclic dicarboxylic acids such as 1,3-cyclohexane dicarboxylic acid, 1,4-cyclohexane dicarboxylic acid and their ester formable derivatives are mentioned.

As the above-mentioned diol component, aliphatic glycols with 2 to 20 carbons, namely ethylene glycol, propylene glycol, 1,4-butane diol, neopentyl glycol, 1,5-pentane diol, 1,6-hexane diol, decamethylene glycol, cyclohexane dimethanol, cyclohexane diol, etc., or long chain glycols of molecular weight of 400 to 6000, namely polyethylene glycol, poly-1,3-propylene glycol, polytetramethylene glycol, etc., and their ester formable derivatives, are mentioned.

As preferable examples of such polymer and copolymer, polybutylene terephthalate, polybutylene (terephthalate/isophthalate), polybutylene (terephthalate/adipate), polybutylene (terephthalate/sebacate), polybutylene (terephthalate/decane dicarboxylate), polybutylene naphthalate, polypropylene terephthalate, polypropylene (terephthalate/isophthalate), polypropylene (terephthalate/adipate), polypropylene (terephthalate/sebacate), polypropylene (terephthalate/decane dicarboxylate), polypropylene naphthalate, polyethylene terephthalate, polyethylene (terephthalate/isophthalate), polyethylene (terephthalate/adipate), polyethylene (terephthalate/5-sodium isophthalate), polybutylene (terephthalate/5-sodium isophthalate), polyethylene naphthalate, polycyclohexanedimethylene terephthalate, etc., are mentioned.

Such polyethylene (F) is an unmodified polyethylene to which a carboxylic group containing monomer such as an unsaturated carboxylic acid or its derivative or a carboxylic acid vinyl ester is not copolymerized.

Such polyamide (F) is a polyamide of which main constituents are amino acid, lactam, or diamine and dicarboxylic acid. As representative examples of the main constituent are, amino acids such as 6-aminocaproic acid, 11-aminoundecanoic acid, 12-aminododecanoic acid and p-aminomethyl benzoate, lactams such as ε-caprolactam, ω-laurolactam and aliphatic, alicyclic or aromatic diamines such as pentamethylene diamine, hexamethylene diamine, 2-methy pentamethylene diamine, nonamethylene diamine, undecamethylene diamine, dodecamethylene diamine, 2,2,4-/2,4,4-trimethyl hexamethylene diamine, 5-methyl nonamethylene diamine, m-xylylene diamine, p-xylylene diamine, 1,3-bis-(aminomethyl)cyclohexane, 1,4-bis(aminomethyl)cyclohexane, 1-amino-3-aminomethyl-3,5,5-trimethyl cyclohexane, bis(4-aminocyclohexyl)methane, bis(3-methyl-4-aminocylohexyl)methane, 2,2-bis(4-aminocyclohexyl)propane, bis(aminopropyl)piperazine and aminoethyl piperazine, and aliphatic, alicyclic or aromatic dicarboxylic acids such as adipinic acid, suberic acid, azelaic acid, sebacic acid, dodecane dioic acid, terephthalic acid, isophthalic acid, 2-chloroterephthalic acid, 2-methyl terephthalic acid, 5-methyl isophthalic acid, 5-sodium sulfoisophthalic acid, 2,6-naththalene dicarboxylic acid, hexahydroterephthalic acid and hexahydroisophthalic acid, are mentioned. In the present invention, nylon homopolymer or copolymer obtained from those starting materials can respectively be used alone or in a form of a mixture.

In the present invention, particularly useful polyamide is a polyamide excellent in heat resistance and strength of which melting point is 150° C. or more, and nylon 6, nylon 66, nylon 12, nylon 610, nylon 6/66 copolymer, or copolymers having hexamethylene terephthalamide unit such as nylon 6T/66 copolymer, nylon 6T/6I copolymer, nylon 6T/12, nylon 6T/6 copolymer, can be mentioned.

Such polypropylene (F) is an unmodified polyethylene to which a carboxylic group containing monomer such as an unsaturated carboxylic acid or its derivative or a carboxylic acid vinyl ester is not copolymerized.

In the present invention, as for the compounding amount of the at least one thermoplastic resin selected from polycarbonate, aromatic polyester, polyethylene, polypropylene and polyvinyl chloride (F) is, based on 100 wt parts in total of the styrene-based resin (A) and the aliphatic polyester (B), in the range of less than 85 wt parts, preferably 65 to 1 wt parts, still more preferably 50 to 5 wt parts and by keeping it in the above-mentioned range, sufficient impact resistance and heat resistance can be attained.

In the present invention, the above-mentioned composition is obtained by mixing the styrene-based resin (A), the aliphatic polyester resin (B), the one species selected from a compatibilizer (C) and a dicarboxylic anhydride (D) and the at least one thermoplastic resin selected from polycarbonate, aromatic polyester, polyamide, polyethylene, polypropylene and polyvinyl chloride (F). By controlling the obtained resin composition in the range of, based on the resin composition, unsaturated carboxylic acid alkyl ester-based unit (a) 1 to 90 wt %, preferably 10 to 80 wt %, the aromatic vinyl-based unit (b) 0.1 to 80 wt %, preferably 1 to 70 wt %, vinyl cyanide based unit (c) 0 to 45 wt %, preferably 0 to 40 wt %, other vinyl-based unit copolymerizable with these components (d) 0 to 85 wt %, preferably 0 to 80 wt %, a sufficient impact resistance and heat resistance can be obtained.

The characterizing feature of the resin composition of the present invention is, that the resin composition comprises a matrix resin which comprises the styrene-based resin (A), the aliphatic polyester (B) and the at least one thermoplastic resin selected from polycarbonate, aromatic polyester, polyamide, polyethylene, polypropylene and polyvinyl chloride (F), and one or more dispersed phases selected from the vinyl-based polymer to which 3 wt % or more of unsaturated carboxylic acid glycidyl ester unit or unsaturated dicarboxylic anhydride unit is copolymerized (C-2), the graft polymer in which 20 to 90 wt % of methyl methacrylate unit is graft polymerized to 10 to 80 wt % of a rubbery polymer (C-3) and the rubbery polymer (E) dispersed in the matrix resin, and that the areal ratio of these dispersed phases (C-2), (C-3) and (E) in the aliphatic polyester (B) is preferably present in the range of 10 to 90%, and in view of impact resistance, heat resistance, moldability, appearance and coloration, the areal ratio is preferably present in the range of 20 to 85%, and is more preferably present in the range of 30 to 80%. If the areal ratio is not present in the range of 10 to 90%, it is not preferable since the impact resistance decreases significantly.

Furthermore, in the present invention, in view of permanent antistaticity, it is preferable that the resin composition contains a polymer with a volume resistivity value (G) of $10^{13}$ Ωcm or less.

As such polymers with a volume resistivity value (G) of $10^{13}$ Ωcm or less (hereafter, abbreviated as the antistatic polymer), polymers containing alkylene oxide residue of a number average molecular weight of 100 to 10,000, quaternary ammonium salt residue, sulfonic acid salt residue or ionomer residue, are mentioned. For example, (1) poly(alkylene oxide)glycols of number average molecular weight of 1,000 to 10,000, (2) polyether amides, polyether esters or polyether ester amides containing an alkylene oxide residue of a number average molecular weight of 200 to 10,000, (3) vinyl-based polymers containing an alkylene oxide residue of a number average molecular weight of 100 to 10,000, (4) vinyl-based polymers containing a quaternary ammonium salt residue, (5) polymers containing an alkali metal salt ionomer residue and (5) vinyl-based polymers containing residue of an alkali metal salt of sulfonic acid, etc., are mentioned.

Concretely, as poly(alkylene oxide)glycols (1), polyethylene glycol, polypropylene oxide glycol, poly(tetramethylene oxide)glycol, poly(hexamethylene oxide)glycol, block or random copolymer of ethylene oxide and propylene oxide, and block or random copolymer of ethylene oxide and tetrahydrofuran, etc., are mentioned.

The polyether amides, polyether esters or polyether ester amides containing an alkylene oxide residue of a number average molecular weight of 200 to 10,000 (2) are block or graft copolymers obtainable through reaction of polyamide formable component (2-a1) or polyester formable component (2-a2) with a diol containing alkylene oxide residue of number average molecular weight of 200 to 10,000 (2-b).

As for polyamide formable component (2-a1), as aminocarboxylic acids or lactams with 6 or more carbon atoms, or salts of diamine-dicarboxylic acid with 6 or more carbon atoms, aminocarboxylic acids such as ω-aminocaproic acid, ω-aminoenanthic acid, ω-aminocaprylic acid, ω-aminopergonic acid, ω-aminocapric acid, 11-aminoundecanoic acid and 2-aminoundecanoic acid, or lactams such as caprolactam, enanthlactam, capryllactam and laurolactam, or salts of diamine-dicarboxylic acid such as hexamethylene-adipic acid salt, hexamethylene diamine-sebacic acid salt and hexamethylene diamine-isophthalic acid salt, are mentioned, and especially, caprolactam, 12-aminododecanoic acid and hexamethylene diamine-adipic acid salt are preferably used.

And, as the polyester formable component (2-a2), as dicarboxylic acid, aromatic dicarboxylic acids such as terephthalic acid, isophthalic acid, phthalic acid, naphthalene-2-6-dicarboxylic acid, nathphalene-2,7-dicarboxylic acid, diphenyl-4,4'-dicarboxylic acid, diphenoxyethane dicarboxylic acid and 3-sodium sulfoisophthalate, alicyclic dicarboxylic acids such as 1,4-cyclohexane dicarboxylic acid, 1,2-cyclohexane dicarboxylic acid, 1,3-cyclopentane dicarboxylic acid, 1,3-dicarboxymethyl cyclohexyl, 1,4-dicarboxymethyl cyclohexyl and dicyclohexyl-4,4'-dicarboxylic acid, aliphatic dicarboxylic acids such as succinic acid, oxalic acid, adipinic acid, sebacic acid and decane dicarboxylic acid, and as aliphatic diol, ethylene glycol, 1,2- or 1,3-propylene glycol, 1,2-, 1,3-, 2,3- or 1,4-butane diol, neopentyl glycol and 1,6-hexane diol, etc., are mentioned. In particular, as dicarboxylic acid, terephthalic acid, isophthalic acid, 1,4-cyclohexane dicarboxylic acid, sebacic acid and decane dicarboxylic acid and as diol, ethylene glycol, 1,2- or 1,3-propylene glycol and 1,4-butane diol are preferably used in view of polymerizability, color and physical properties.

As the diol containing alkylene oxide residue of number average molecular weight of 200 to 10,000 (2-b), poly(ethylene oxide)glycol, poly(1,2-propylene oxide)glycol, poly(1,3-propylene oxide)glycol, poly(tetramethylene oxide)glycol, poly(hexamethylene oxide)glycol, block or random copolymer of ethylene oxide and propylene oxide and block or random copolymer of ethylene oxide and tetrahydrofuran, etc., are mentioned. Among them, in view of excellence of electrostaticity, especially poly(ethylene oxide) glycol is preferably used.

And, as the diol containing alkylene oxide residue of average molecular weight of 200 to 10,000, those added to both ends of hydroquinone, bisphenol A or naphthalene are included.

As the number average molecular weight of the diol containing alkylene oxide residue (2-b), the range of 100 to 10,000, preferably 400 to 6,000 is preferably used in view of polymerizability and electrostaticity.

As the reaction of the polyimide formable component (2-a1) or the polyester formable component (2-a2) with the diol containing alkylene oxide residue (2-b), an esterification or amidification is applied depending on the end groups of diol containing alkylene oxide residue (b).

Depending on the above-mentioned reaction, third component such as dicarboxylic acid or diamine can be used.

In this case, as dicarboxylic acids, aromatic dicarboxylic acid represented by terephthalic acid, isophthalic acid, phthalic acid, naphthalene-2-6-dicarboxylic acid, nathphalene-2,7-dicarboxylic acid, diphenyl-4,4'-dicarboxylic acid, diphenoxyethane dicarboxylic acid and 3-sodium sulfoisophthalate, alicyclic dicarboxylic acid represented by 1,4-cyclohexane dicarboxylic acid, 1,2-cyclohexane dicarboxylic acid and dicyclohexyl-4,4'-dicarboxylic acid, and aliphatic dicarboxylic acid represented by succinic acid, oxalic acid, adipinic acid, sebacic acid and decane dicarboxylic acid, etc., are mentioned. In particular, terephthalic acid, isophthalic acid, 1,4-cyclohexane dicarboxylic acid, sebacic acid, adipinic acid and decane dicarboxylic acid are preferably used in view of polymerizability, color and physical properties of the resin composition.

In addition, if necessary, it is possible to use tricarboxylic anhydrides such as trimellitic anhydride.

As diamine component, aromatic, alicyclic or aliphatic diamines are mentioned. Among them, hexamethylene diamine of aliphatic diamine is preferably used for an economical reason.

The amount of diol containing alkylene oxide residue (2) is, as structural unit of the polyether amide, polyether ester and polyether ester amide, 30 to 90 wt %, preferably 40 to 80 wt %.

The degree of polymerization of polyether amide, polyether ester and polyether ester amide (2) is not especially limited, but it is preferred that the relative viscosity (ηr) of their 0.5% octochlorophenol solution measured at 25° C. is 1.1 to 4.0, preferably 1.5 to 2.5, in view of the mechanical properties and moldability of the final resin composition.

As the vinyl-based polymer containing alkylene oxide of number average molecular weight of 100 to 10,000 (3), copolymers of polyethylene glycol (meth)acrylate, methoxypolyethylene glycol (meth)acrylate, etc., with at least one vinyl-based monomer selected from olefins such as ethylene, propylene, 1-butene, aromatic vinyl-based monomers such as styrene, vinyltoluene, α-methyl styrene, maleimide-based monomers such as maleimide, N-phenyl maleimide, vinyl cyanide-based monomers such as acrylonitrile, graft copolymers in which monomer containing at least one monomer selected from polyethylene glycol (meth)acrylate and methoxypolyethylene glycol (meth)acrylate to the above-mentioned rubbery polymer (r), etc., are mentioned.

The ratio of the above-mentioned monomer containing alkylene oxide residue is, as unit of the vinyl-based polymer containing poly(alkylene oxide) glycol residue, preferably in the range of 5 to 40 wt %.

As the vinyl-based polymer containing a quaternary ammonium salt residue (4), copolymers of a monomer containing a quaternary ammonium base with at least one vinyl-based monomer selected from olefins such as ethylene, propylene, 1-butene, aromatic vinyl-based monomers such as styrene, vinyltoluene, α-methyl styrene, acrylic ester-based monomers such as methyl (meth)acrylate, butyl (meth)acrylate, maleimide-based monomers such as maleimide, N-phenyl maleimide, and vinyl cyanide-based monomers such as acrylonitrile, are mentioned. For example, "Leorex" SA-70 and AS-170 of Dai-Ichi Kogyo Seiyaku Co., Ltd. are commercially available.

The ratio of the monomer containing quaternary ammonium base is, as unit of the vinyl-based monomer containing quaternary ammonium salt residue, preferably in the range of 10 to 80 wt %.

As polymers containing alkali metal ionomer residue (5), resins in which copolymers of olefin-based monomer such as ethylene, propylene or 1-butene with (meth)acrylate are made into ionomers with at least one metal selected from lithium, natrium and kalium, are mentioned.

A polymer containing an ionomer residue of which metal ion concentration is 1.5 mol/kg or more is preferable.

As the vinyl-based polymer containing residue of an alkali metal salt of sulfonic acid (6), copolymers of a monomer containing an alkali metal base of sulfonic acid, for example, potassium styrene sulfonate, sodium styrene sulfonate, lithium styrene sulfonate with at least one vinyl-based monomer selected from olefins such as ethylene, propylene, 1-butene, aromatic vinyl-based monomers such as styrene, vinyltoluene, α-methyl styrene, acrylic ester-based monomers such as methyl (meth)acrylate, butyl (meth)acrylate, maleimide-based monomers such as maleimide and N-phenyl maleimide, and vinyl cyanide-based monomers such as acrylonitrile, are mentioned. The ratio of the monomer containing alkali metal base of sulfonic acid is, as unit of the vinyl-based polymer containing the residue of alkali metal base of sulfonic acid, preferably in the range of 10 to 80 wt %.

The volume resistivity value of the antistatic polymer (G) is less than $10^{13}$ Ωcm, preferably less than $5 \times 10^{11}$ Ωcm, and the lower limit is not limited but $10^5$ Ωcm or more, in particular $10^6$ Ωcm or more is preferable since it is economical.

If the volume resistivity value of the antistatic polymer (G) is more than $10^{13}$ Ωcm, the antistaticity of the finally obtained resin composition is insufficient and it is not preferable.

The volume resistivity value of the antistatic polymer (G) is determined according to ASTM D257. When it is necessary to determine from a resin composition, the antistatic polymer isolated from the resin composition is molded by press molding or injection molding and the molded article is subjected to the measurement. In addition, as a simple method, according to ASTM D257, a calibration curve between the amount of conductive unit contained in the antistatic polymer such as poly(alkylene oxide) glycol residue, quaternary ammonium salt residue, sulfonic acid salt residue or ionomer residue and volume resistivity is prepared, and then, by analyzing the content of the conductive unit of any antistatic polymer, it is possible to know the volume resistivity of said polymer.

In the present invention, by making the amount to be compounded of the polymer with volume resistivity of $10^{13}$ Ωcm or less (G), based on 100 wt % in total of the styrene-based resin (A) and the aliphatic polyester (B), in the range of 1 to 30 wt %, preferably 5 to 20 wt %, it is possible to achieve sufficiently permanent antistaticity.

The above-mentioned resin composition of the present invention is obtained by mixing the styrene-based resin (A), the aliphatic polyester (B), the at least one species selected from the compatibilizer (C) and the dicarboxylic anhydride (D) and the polymer with volume resistivity of $10^{13}$ Ωcm or less (G), but by making the obtained resin composition in the range of, based on the resin composition, the unsaturated carboxylic acid alkyl ester-based unit (a) 1 to 90 wt %, preferably 10 to 80 wt %, the aromatic vinyl-based unit (b) 0.1 to 80 wt %, preferably 1 to 70 wt %, vinyl cyanide based unit (c) 0 to 45 wt %, preferably 0 to 40 wt %, other vinyl-based unit copolymerizable with these components (d) 0 to 85 wt %, preferably 0 to 80 wt %, a sufficient impact resistance and heat resistance can be obtained.

The characterising feature of the resin composition of the present invention is that the resin composition comprises a matrix resin which comprises the styrene-based resin (A), the aliphatic polyester (B) and the polymer with volume resistivity of $10^{13}$ Ωcm or less (G), and one or more dispersed phases selected from the vinyl-based polymer to which 3 wt % or more of unsaturated carboxylic acid glycidyl ester unit or unsaturated dicarboxylic anhydride unit is copolymerized (C-2), the graft polymer in which 20 to 90 wt % of methyl methacrylate unit is graft polymerized to 10 to 80 wt % of a rubbery polymer (C-3) and the rubbery polymer (E) dispersed in the matrix resin, and that the areal ratio of these dispersed phases (C-2), (C-3) and (E) in the aliphatic polyester (B) is preferably in the range of 10 to 90%, and in view of impact resistance, heat resistance, moldability, appearance and coloration, the areal ratio is preferably present in the range of 20 to 85%, and is more preferably present in the range of 30 to 80%. If the areal ratio is not present in the range of 10 to 90%, it is not preferable since the impact resistance decreases significantly.

As for the resin composition of the present invention, it is preferable to compound a nucleating agent (H) for improving heat resistance.

As nucleating agents used in the present invention, those generally used as a nucleating agent for polymers can be used without special limitation, and both of inorganic nucleating agents and organic nucleating agents can be used.

As examples of inorganic nucleating agent, talc, kaolinite, montmorillonite, mica, synthetic mica, clay, zeolite, silica, graphite, carbon black, zinc oxide, magnesium oxide, calcium oxide, titanium oxide, calcium sulfide, boron nitride, magnesium carbonate, calcium carbonate, barium sulphate, aluminium oxide, neodymium oxide and metal salts of phenyl phosphonate, etc., are mentioned and in view of excellent improvement of heat resistance, talc, kaolinite, montmorillonite and synthetic mica are preferable. These can be used alone or in combination of two or more species. It is preferable that these inorganic nucleating agents are modified by organic substance in order to improve dispersibility in the composition.

The amount of the inorganic nucleating agent is, based on 100 wt % in total of the styrene-based resin (A) and the aliphatic polyester (B), preferably 0.01 to 100 wt parts, more preferably 0.05 to 50 wt parts, still more preferably, 1 to 30 wt parts.

And, as examples of the organic nucleating agent, organic carboxylic acid metal salts such as sodium benzoate, potassium benzoate, lithium benzoate, calcium benzoate, magnesium benzoate, barium benzoate, lithium terephthalate, sodium terephthalate, potassium terephthalate, calcium oxalate, sodium laurate, calcium laurate, sodium myristate, potassium mirystate, calcium myristate, sodium octacosanate, calcium octacosanate, sodium stearate, potassium stearate, lithium stearate, calcium stearate, magnesium stearate, barium stearate, sodium montanate, calcium montanate, sodium toluoylate, sodium salicylate, potassium salicylate, zinc salicylate, aluminum dibenzoate, potassium dibenzoate, lithium dibenzoate, sodium β-naphthalate, sodium cyclohexane carboxylate, organic sulfonic acid salts such as sodium p-toluene sulfonate, sodium sulfoisophthalate, carboxylic amides such as stearic amide, ethylene bislauric amide, palmitic amide, hydroxystearic amide, erucic amide, trimesic acid tris(t-butyl amide), trimesic acid tricyclohexylamide, hydrazide compounds such as phthalic hydrazide, adipinic hydrazide, sebacic hydrazide, sebacic dibenzoic hydrazide, polymers such as low density polyethylene, high density polyethylene, polypropylene, polyisopropylene, polybutene, poly-4-methyl pentene, poly-3-methyl butene-1, polyvinyl cycloalkane, polyvinyl trialkyl silane, high melting point polylactide, melamine-based compounds such as melamine cyanurate, polyphosphoric melamine, sodium or potassium salt or polymers having carboxylic acid group (so-called ionomer) such as sodium salt of ethylene-acrylic acid or methacrylic acid copolymer and sodium salt of styrene-maleic anhydride copolymer, benzylidene sorbitol and its derivative, metal salts of phosphrous compound such as sodium 2,2'-methylene bis(4,6-di-t-butylphenyl)phosphate, zinc phenylphosphonate, calcium phenylphosphonate, magnesium phenylphosphonate, 2,2-methy bis(4,6-di-t-butylphenyl), etc., are mentioned, and in view of excellent improvement of heat resistance, metal salts of organic carboxylic acid and carboxylic acids are preferable. These can be used alone or in combination of two or more species.

The amount to be added of the organic nucleating agent is, based on 100 wt parts in total of the styrene-based resin (A) and the aliphatic polymer (B), preferably 0.01 to 30 wt parts, more preferably 0.05 to 10 wt parts, still more preferably 0.1 to 5 wt parts.

In the present invention, in view of improving heat resistance, it is preferable to further compound a plasticizer (I).

As the plasticizer used in the present invention, those generally used as plasticizer of polymers can be used without special limitation, for example, polyester-based plasticizer, glycerin-based plasticizer, multi-functional carboxylic ester-based plasticizer, polyalkylene glycol-based plasticizer and epoxy-based plasticizer, etc., can be mentioned.

As examples of the polyester-based plasticizer, polyesters obtained from an acid component such as adipinic acid, sebacic acid, terephthalic acid, isophthalic acid and naphthalene dicarboxylic acid, and a diol component such as propylene glycol, 1,3-butane diol, 1,4-butane diol, 1,6-hexane diol, ethylene glycol and diethylene glycol, or polyesters obtained from hydroxycarboxylic acid such as polycaprolactone, etc., can be mentioned. These polyesters may be blocked at their molecular ends with a monofunctional carboxylic acid or a monofunctional alcohol, and may also be blocked at their molecular ends with an epoxy compound, etc.

As examples of glycerin-based plasticizer, glycerin monoacetomonolaurate, glycerin diacetomonolaurate, glycerin monoacetomonostearate, glycerin diacetomonooleate, glycerin monoacetomonomontanate, etc., can be mentioned.

As examples of polyfunctional carboxylic acid-based plasticizer, phthalic esters such as dimethyl phthalate, diethyl phthalate, dibutyl phthalate, dioctyl phthalate, diheptyl phthalate, dibenzyl phthalate and butyl benzyl phthalate, trimellitic esters such as tributyl trimellitate, trioctyl trimellitate and trihexyl trimellitate, adipic esters such as diisodecyl adipate, n-octyl-n-decyl adipate and benzylmethylglycol adipate, citric esters such as triethyl acetylcitrate and tributyl acetylcitrate, azelaic esters such as di-2-ethylhexyl azelate, sebacic esters such as dibutyl sebacate and di-2-ethyhexyl sebacate, can be mentioned.

As examples of alkylene glycol-based plasticizer, polyalkylene glycols and their end groups blocked compounds, i.e., end groups epoxy modified compound, end groups ester modified compound and end groups ether modified compound, such as polyethylene glycol, polypropylene glycol, poly(ethylene oxide.propylene oxide) block or random copolymer, polytetramethylene glycol, ethylene oxide addition polymer of bisphenols, propylene oxide addition polymer of bisphenols and tetrahydrofuran addition polymer of bisphenols, etc., can be mentioned.

Epoxy-based plasticizer generally means epoxy triglyceride or the like comprising alkyl epoxystearate and soybean oil, but other than that, so-called epoxy resin made such as from bisphenol A and epichlorohydrin as starting material, can also be used.

As examples of other plasticizer, benzoic ester of aliphatic polyol such as neopentyl glycol dibenzoate, diethylene glycol dibenzoate, triethylene glycol di-2-ethyl butylate and polyethylene glycol dibenzoate, fatty acid amides such as stearic amide, aliphatic carboxylic ester such as butyl oleate, oxy acid esters such as methyl acetylricinoleate, butyl acetylricinoleate, pentaerythritol, various sorbitols, polyacrylic ester, silicone oil and paraffins can be mentioned.

As plasticizers used in the present invention, among the above-mentioned, in particular, at least one selected from polyester-based plasticizer and polyalkylene glycol-based plasticizer is preferable. Plasticizers used in the present invention can be used alone or in combination of two or more species.

The amount to be compounded of the plasticizer is, based on 100 wt parts in total of the styrene-based resin (A) and the aliphatic polymer (B), preferably in the range of 0.01 to 30 wt parts, more preferably in the range of 0.1 to 20 wt parts, still more preferably in the range of 0.5 to 10 wt parts.

In the present invention, the nucleating agent and the plasticizer may be used alone, but it is preferable to used them in combination.

As for the resin composition of the present invention, in view of improving heat resistance, it is preferable to further add a filler other than the inorganic nucleating agent (J).

As the filler other than the inorganic nucleating agent used in the present invention, a fibrous, platy, granular or powdery substance usually used for reinforcing thermoplastic resin can be used. Concretely, fibrous inorganic fibers such as glass fiber, asbestos fiber, carbon fiber, graphite fiber, metallic fiber, potassium titanate whisker, aluminum borate whisker, magnesium-based whisker, silicon-based whisker, wollastonite, sepiolite, asbestos, slug fiber, zonolite, ellestadite, gypsum fiber, silica fiber, silica alumina fiber, zirconia fiber, boron nitride fiber and boron fiber, platy or granular inorganic fillers such as glass flake, graphite, metallic foil, ceramic beads, sericite, bentonite, dolomite, fine powdered silicate, feldspar powder, potassium titanate, shirasu balloon, aluminum silicate, silicon oxide, gypsum, novaculite, dawsonite and terra alba, fibrous organic fillers such as polyester fiber, nylon fiber, acrylic fiber, regenerated cellulose fiber, acetate fiber, kenaf fiber, bamboo fiber, hemp fiber, jute fiber, rami fiber, banana fiber, coconut fiber, cotton fiber, sisal fiber, flax fiber, linen fiber, silk fiber, Manila hemp fiber, sugar cane fiber, bagasse, wood pulp, wastepaper, used paper and animal fiber such as silk, wool, angora, cashmere and camel, chip-like or powdered organic fillers such as wood chip, bean curd lees, milled material of used paper, milled garment, powdered paper, powdered wood, powdered kenaf, powdered bamboo, powdered cellulose, powdered chaff, powdered fruits, powdered chitin, powdered chitosan, protein and starch, are mentioned. Among these fillers, fibrous inorganic fillers are preferable and glass fiber and wollastonite are especially preferable. In addition, use of fibrous organic fillers is also preferable, and in view of helping biodegradability of the aliphatic polyester (B), natural fiber or regenerated fiber is more preferable. And, the aspect ratio of fibrous filler to be compounded (average fiber length/average fiber diameter) is preferably 5 or more, more preferably 10 or more, still more preferably 20 or more.

The above-mentioned fillers may be coated or bundled with a thermoplastic resin such as ethylene/vinyl acetate copolymer, or a thermosetting resin such as epoxy resin, or may be treated with a coupling agent such as aminosilane or epoxy silane.

The amount to be compounded of the filler is, based on 100 wt parts in total of the styrene-based resin (A) and the aliphatic polymer (B), preferably 0.1 to 200 wt parts and is more preferably 0.5 to 100 wt parts.

As for the resin composition of the present invention, in view of improvement of heat resistance by preventing hydrolysis, it is preferable to further compound a carboxyl group reactive molecular end blocking agent (K).

As the carboxyl group reactive molecular end blocking agent of the present invention, it is not especially limited as far as it can block carboxyl end group and those usable as a blocking agent of carboxyl end group of polymers can be used. In the present invention, such a carboxyl group reactive molecular end blocking agent can block not only the molecular end of the aliphatic polyester (B), but also can block carboxyl group of acidic low molecular weight compounds, generated by pyrolysis or hydrolysis of organic fillers from natural resources, such as lactic acid and formic acid. In addition, it is further preferable that those molecular end blocking agents are compounds which can also block hydroxyl end groups which are generated by pyrolysis of acidic low molecular weight compound.

As such a carboxyl group reactive molecular end blocking agent, it is preferable to use at least one compound selected from an epoxy compound, an oxazoline compound, an oxazine compound, a carbodiimide compound and an isocyanate compound, and among them, an epoxy compound and/or a carbodiimide compound is preferable.

The amount to be compounded of the carboxyl group reactive molecular end blocking agent is, based on 100 wt parts in total of the styrene-based resin (A) and the aliphatic polymer (B), preferably 0.01 to 10 wt parts and is more preferably 0.05 to 5 wt parts.

The timing of addition of the carboxyl group reactive molecular end blocking agent is not especially limited, but in view of not only improving heat resistance, but also being able to improve mechanical properties and durability, it is preferable to be melt-kneaded with the aliphatic polyester (B) beforehand, and then kneaded with other components.

In the present invention, as far as it does not spoil the purpose of the present invention, it is possible to add a stabilizer (antioxidant, ultra-violet absorber, and weather resistant agent), a lubricant, a flame retarder, a colorant containing a dye or a pigment, an antistatic agent and a foaming agent, etc.

In the present invention, as far as in the range which does not spoil the purpose of the present invention, it is possible to further contain at least one species of other thermoplastic resin (for example, polyamide resin, polyphenylene sulfide resin, polyetheretherketone resin, polysulfone resin, polyethersulfone resin, aromatic polycarbonate resin, polyarylate resin, polyphenyleneoxide resin, polyacetal resin, polyimide resin, polyetherimide resin, aromatic or aliphatic polyketone resin, fluororesin, polyvinylchloride resin, vinylester-based resin, cellulose acetate resin, polyvinylalcohol resin, etc.) or thermosetting resin (for example, phenol resin, melamine resin, polyester resin, silicone resin and epoxy resin, etc.) or the like. By compounding these resins, it is possible to obtain a molded article having excellent characteristics.

These additives can be compounded in an arbitrary step in producing the resin composition of the present invention, and, for example, at compounding the (A), (B), (C) and (D) components, a method of adding them simultaneously, or a method of melt-kneading at least two components beforehand and then adding the additives, are mentioned.

The production method of the resin composition of the present invention is not especially limited, but for example, a method of blending beforehand the styrene-based resin (A), the aliphatic polyester (B) and at least one species selected from the compatibilizer (C) and the dicarboxylic anhydride (D) and, if necessary, the nucleating agent, the plasticizer, the filler and the other additives, and then, above the melting point, uniformly melt-kneading with single- or twin screw extruder, or a method of mixing in a solution and then removing the solvent or the like are preferably applied, and in view of strength, impact resistance, heat resistance, moldability and appearance, the method of uniformly melt-kneading with a twin screw extruder is more preferable.

The resin composition obtained in the present invention can be molded in an arbitrary way such as injection molding, inflation molding or blow molding which is usually well known, and can be widely used as a molded article of any shape. The molded articles means a film, a sheet, a fiber, a cloth, a non-woven fabric, an injection molded article, an extruded molded article, a vacuum pressure molded article, a blow molded article or a composite body with other material. They are useful as automobile materials such as automobile interior parts and automobile exterior parts, electric or electronic materials such as for TV, air conditioner, cleaner, refrigerator, telephone, fax, audio-visual devices, camera, watch, computer, personal computer, printer and copy machine, parts for toilet such as toilet seat, parts for kitchen and bathroom, materials for civil engineering and construction such as construction sheet, mold frame and window frame, agricultural materials, gardening materials, fishing materials, stationeries, medical materials or sundry goods, or as other uses. In addition, the molded article can be used after finishing by coating or plating, etc.

EXAMPLES

In order to explain in more detail, in the following, the present invention is explained with reference to examples and comparative examples, but it is not limited thereto. In the examples, parts and % means weight parts and weight %, respectively.

Reference Example 1

Styrene-based Resin (A)

The preparation method of the styrene-based resin (A) is shown below. After the obtained polymer was dried at 70° C. for 5 hours under vacuum, a solution in methyl ethyl ketone of 0.4 g/100 ml concentration was prepared and the intrinsic viscosity was measured at a temperature of 30° C. by Ubbelohde viscometer.

<A-1>
"HF77" produced by PS Japan Corp. was used.
<A-2>
A solution of 0.05 wt parts of methyl methacrylate/acrylic amide copolymer (described in JP-B-S45-24151) dissolved in 165 wt parts of ion-exchanged water was added to a stainless steel autoclave of 20 l volume equipped with a baffle and a pfaudler type agitator and agitated at 400 rpm, and the inside was filled with nitrogen gas. Next, the following mixture was added to the reaction system while agitating, and the temperature was elevated to 60° C. to start polymerization.

| Styrene | 70 wt parts |
|---|---|
| Acrylonitrile | 30 wt parts |
| t-dodecyl mercaptane | 0.2 wt part |
| 2,2'-azobisisobutylonitrile | 0.4 wt part |

After the reaction temperature was elevated to 65° C. in 30 minutes, the temperature was further elevated to 100° C. in 120 minutes. After that, according to ordinary way, cooling of the reaction system, isolation, washing and drying of the polymer were carried out to obtain a beads-like polymer. The intrinsic viscosity of methyl ethyl ketone soluble component of the obtained styrene-based polymer was 0.53 dl/g.
<A-3>
A suspension polymerization was carried out in the same way except changing the styrene 70 wt parts and acrylonitrile 30 wt parts of the above-mentioned <A-2> to methyl methacrylate 70 wt parts, styrene 25 wt parts and acrylonitrile 5 wt pats. The intrinsic viscosity of methyl ethyl ketone soluble components of the obtained styrene-based polymer was 0.35 dl/g.
<A-4>
Styrene 50 wt parts, acrylonitrile 10 wt parts, N-phenyl maleimide 40 wt parts, t-dodecyl mercaptane 0.2 wt parts and 2,2'-azobisisobutylonitrile 0.4 wt parts were solution polymerized in cyclohexane solvent. After that, according to ordinary way, a polymer was obtained by carrying out cooling of the reaction system, reprecipitation by methanol solution, washing, drying and crashing. The intrinsic viscosity of methyl ethyl ketone soluble components of the obtained styrene-based resin was 0.33 dl/g.
<A-5>
A suspension polymerization was carried out in the same way except changing the amount of t-dodecyl mercaptane of the above-mentioned <A-2> to 0.35 wt part. The intrinsic viscosity of methyl ethyl ketone soluble components of the obtained styrene-based polymer was 0.41 dl/g.
<A-6>
A solution of 0.5 wt parts of methyl methacrylate/acrylic amide copolymer (described in JP-B-S45-24151) dissolved in 1650 g of ion-exchanged water was added to a reaction vessel equipped with an agitator and agitated and the inside was filled with nitrogen gas. Next, styrene (700 g: produced by Tokyo Chemical Industry Co., Ltd.), acrylonitrile (300 g: produced by Tokyo Chemical Industry Co., Ltd.), t-dodecyl mercaptane 4 g and 2,2'-azobisisobutylonitrile 4 g were added while agitating, and the temperature was elevated to 60° C. to start polymerization. After the reaction temperature was elevated to 65° C. in 15 minutes, the temperature was elevated to 100° C. in 50 minutes. After that, according to ordinary way, cooling of the reaction system, isolation, washing and drying of the polymer were carried out to obtain a styrene-based resin of a number average molecular weight measured by GPC of 52,000 (yield: 97%).

Reference Example 2

Aliphatic Polyester (B)

<B-1>
Poly-L-lactide of weight average molecular weight 160,000 with D-lactic acid unit 1.2%, was used.
<B-2>
Poly-L-lactide of weight average molecular weight 210,000 with D-lactic acid unit 4%, was used.
<B-3>
Poly-L-lactide of weight average molecular weight 200,000 with D-lactic acid unit 1%, was used.

Reference Example 3

Compatibilizer (C)

<C-1> Methyl Methacrylate Polymer
<C-1-1>
Methacrylic resin ("Sumipex LG21" produced by Sumitomo Chemical Co., Ltd.: Tg 105° C., syndiotacticity 41%, weight average MW 80,000, MFR 21 g/10 minutes (230° C., 37.2N))
<C-1-2>
Methacrylic resin ("Parapet" HR-L produced by Kuraray Co., Ltd.: Tg 117° C., syndiotacticity 56%, weight average MW 90,000, MFR 2 g/10 minutes (230° C., 37.2N))

<C-2> Vinyl-based polymer in which unsaturated carboxylic glycidyl ester unit or unsaturated dicarboxylic-anhydride unit is copolymerized in 3 wt % or more

<C-2-1>

Glycidyl methacrylate modified styrene/acryl copolymer ("Arufon" UG-4030 produced by Toagosei Co., Ltd.: glycidyl methacrylate 20 wt %, glass transition temperature 51° C., weight average MW 10,000)

<C-2-2>

Glycidyl methacrylate modified styrene/acryl copolymer ("Joncryl" ADR-4368 produced by Jhonson Polymer Corpo.: glycidyl methacrylate 49 wt %, glass transition temperature 54° C., weight average MW 8,000)

<C-2-3>

Ethylene/glycidyl methacrylate/methyl acrylate copolymer ("Bondfast" 7M produced by Sumitomo Chemical Co., Ltd.: glycidyl methacrylate 6 wt %)

<C-2-4>

Maleic anhydride modified SEBS ("Tuftec" M1913 produced by Asahi Kasei Chemicals Corp.: maleic anhydride 1 wt %)

<C-3> Graft copolymer in which 20 to 90 wt % methyl methacrylate unit is graft polymerized to 10 to 80 wt % of rubbery polymer A preparation method of the graft copolymer is described below. Here, the graft ratio was determined by the following way. Acetone was added to a predetermined amount (m) of graft polymer and refluxed for 4 hours. After this solution was centrifuged at 8000 rpm (centrifugal force 10,000 G (about $100 \times 10^3$ m/s$^2$)) for 30 minutes, the insoluble component was filtered. The insoluble component was dried under vacuum at 70° C. for 5 hours and weighed (n).

$$\text{Graft ratio} = [(n)-(m) \times R]/[(m) \times R] \times 100$$

Here, R denotes the rubber content of the graft copolymer.

The filtrate of the above-mentioned acetone solution was concentrated by a rotary evaporator, and obtained a precipitate (acetone soluble component). After drying this soluble component under vacuum at 70° C. for 5 hours, a solution in methyl ethyl ketone of 0.4 g/100 ml was prepared and its intrinsic viscosity was measured using an Ubbelohde viscometer at a temperature of 30° C.

<C-3-1>

| | |
|---|---|
| Polybutadiene (weight average particle diameter 0.35 μm) (Nipol LX111 produced by Zeon Corp.) | 50 wt parts (based on solid component) |
| Potassium oleate | 0.5 wt parts |
| Glucose | 0.5 wt part |
| Sodium pyrophosphate | 0.5 wt part |
| Ferrous sulfate | 0.005 wt part |
| Deionized water | 120 wt parts |

The above-mentioned substances were put into a polymerization vessel and the temperature was elevated to 65° C. while being stirred. When the inside temperature reached to 65° C., it was considered as the starting temperature of polymerization and, methyl methacrylate 35 wt parts, styrene 12.5 wt parts, acrylonitrile 2.5 wt parts and t-dodecyl mercaptane 0.3 wt parts were continuously dropped for 5 hours. In parallel, an aqueous solution of cumene hydroperoxide 0.25 wt parts, potassium oleate 2.5 wt parts and pure water 25 wt parts was continuously dropped for 7 hours to complete the reaction. The obtained graft copolymerized latex was coagulated with sulfuric acid and after neutralized with caustic soda, washed, filtered and dried to obtain in a powdery state. The graft ratio of the obtained graft copolymer was 40%, and the intrinsic viscosity of the methyl ethyl ketone soluble component was 0.30 dl/g.

<C-3-2>

A emulsion polymerization was carried out in the same way except methyl methacrylate 35 wt parts, styrene 12.5 wt parts and acrylonitrile 2.5 wt parts of the above-mentioned <C-3-1> were changed to methyl methacrylate 42.5 wt parts and styrene 7.5 wt parts. The graft ratio of the obtained graft copolymer was 42% and the intrinsic viscosity of the methyl ethyl ketone soluble component was 0.28 dl/g.

<C-3-3>

A emulsion polymerization was carried out in the same way except methyl methacrylate 35 wt parts, styrene 12.5 wt parts and acrylonitrile 2.5 wt parts of the above-mentioned <C-3-1> were changed to methyl methacrylate 50 wt parts. The graft ratio of the obtained graft copolymer was 43% and the intrinsic viscosity of the methyl ethyl ketone soluble component was 0.27 dl/g.

<C-4> Block copolymer in which the polylactide segment represented by the general formula (I) and the vinyl-based polymer segment represented by the general formula (II) were bonded in a copolymerization ratio ((I)/(II)) of 99/1 to 1/99 wt parts (here, (I)+(II)=100 wt parts)

<C-4-1>

At first, in order to synthesize a starting material containing hydroxyl groups at molecular ends, a styrene-acrylonitrile copolymer (c-4-1) was synthesized using a chain transfer agent containing a hydroxyl group. Styrene (produced by Tokyo Chemical Industry Co., Ltd.: 527 g), acrylonitrile (produced by Tokyo Chemical Industry Ltd.: 205 g), mercaptoethanol (produced by Aldrich: 4.2 g), benzoyl peroxide 3.58 g and de-watered tetrahydrofuran 900 ml were reacted in a reaction vessel equipped with a stirrer at 84° C. in nitrogen atmosphere under reflux for 24 hours. After the reaction, the reaction mixture was cooled to room temperature, concentrated with an evaporator, dropped in methanol to completely remove the monomers and after reprecipitation purification, vacuum-dried at 80° C. for 12 hours to obtain a white powder. The obtained white powder was a styrene-acrylonitrile copolymer of number average molecular weight of 26,000, based on a result of GPC determination.

$^1$H-NMR (DMSO solvent) measurement of the obtained styrene-acrylonitrile copolymer (c-4-1) was carried out and CH and CH2 based on styrene, CH based on aromatic nucleus, CH and CH2 based on acrylonitrile and CH2OH of end group blocked by mercaptoethanol were confirmed around 1.2 ppm to 2.9 ppm, around 6.4 ppm to 7.2 ppm, around 1.5 ppm to 2.5 ppm and around 3.6 ppm, respectively.

Next, after L-lactide (150 g: produced by Purac Co. Ltd) and the obtained styrene-acrylonitrile copolymer (c-4-1) 100 g were dissolved in a reaction vessel equipped with an agitator under nitrogen atmosphere at 150° C., tin octylate (1.0 g/toluene 2 ml: produced by Aldrich Co. Ltd.) was added and then subjected to a polymerization reaction for 3 hours. After finishing the polymerization reaction, the reactant was dissolved in chloroform, precipitated in methanol while being agitated and monomer was removed completely to thereby obtain a block copolymer 1 of polylactide and the styrene-acrylonitrile (yield 89%). $^1$H-NMR measurement of the obtained block copolymer was carried out and it was found that the number average molecular weight of polylactide obtained by peak ratio was 36,000 and the weight ratio (polylactide/styrene-acrylonitrile copolymer) was 58.5/41.5 wt parts. $^1$H-NMR (DMSO solvent) measurement of the styrene-acrylonitrile copolymer was carried out and CH and CH2 based on styrene, CH based on aromatic nucleus, CH and CH2 based on acrylonitrile, and CH and CH3 based on polylactide were confirmed around 1.2 ppm to 2.9 ppm, around 6.4 ppm to 7.2 ppm, around 1.5 ppm to 2.5 ppm, and at 5.2 ppm and 1.5 ppm, respectively.

<C-4-2>

After L-lactide (100 g: produced by Purac Co. Ltd) and the styrene-acrylonitrile copolymer (c-4-1) synthesized at <C-4-1> synthesis 100 g were dissolved in a reaction vessel equipped with an agitator under nitrogen atmosphere at 150° C., tin octylate (1.0 g/toluene 2 ml: produced by Aldrich Co. Ltd.) was added and then subjected to a polymerization reaction for 3 hours. After finishing the polymerization reaction, the reactant was dissolved in chloroform, precipitated in methanol while being agitated and monomer was removed completely to thereby obtain a block copolymer 2 of polylactide and the styrene-acrylonitrile (yield 91%). $^1$H-NMR measurement of the obtained block copolymer 2 was carried out and it was found that the number average molecular weight of the polylactide obtained by peak ratio was 21,000 and the weight ratio (polylactide/styrene-acrylonitrile copolymer) was 45.1/54.9 wt parts. $^1$H-NMR (DMSO solvent) measurement of the styrene-acrylonitrile copolymer was carried out and CH and CH2 based on styrene, CH based on aromatic nuclei, CH and CH2 based on acrylonitrile, and CH and CH3 based on polylactide were confirmed around 1.2 ppm to 2.9 ppm, around 6.4 ppm to 7.2 ppm, around 1.5 ppm to 2.5 ppm, and at 5.2 ppm and 1.5 ppm, respectively.

Reference Example 4

Dicarboxylic Anhydride (D)

<D-1>

Maleic anhydride produced by Tokyo Chemical Industry Co., Ltd. was used.

<D-2>

Succinic anhydride produced by Tokyo Chemical Industry Co., Ltd. was used.

Reference Example 5

Rubbery Polymer (E)

<E-1>

| | | |
|---|---|---|
| Polybutadiene (weight average particle diameter 0.35 μm) (Nipol LX111K: produced by Nihon Zeon Corp.) | 50 wt parts (based on solid component) | |
| Potassium oleate | 0.5 wt part | |
| Glucose | 0.5 wt part | |
| Sodium pyrophosphate | 0.5 wt part | |
| Ferrous sulfate | 0.005 wt part | |
| Deionized water | 120 wt part | |

The above-mentioned substances were put into a polymerization vessel and the temperature was elevated to 65° C. while being agitated. When the inside temperature reached to 65° C., it was considered as the starting temperature of polymerization and, styrene 35 wt parts, acrylonitrile 15 wt parts and t-dodecyl mercaptane 0.3 wt parts were continuously dropped for 5 hours. In parallel, an aqueous solution of cumene hydroperoxide 0.25 wt parts, potassium oleate 2.5 wt parts and pure water 25 wt parts was continuously dropped for 7 hours to complete the reaction. The obtained graft copolymerized latex was coagulated with sulfuric acid and after neutralized with caustic soda, washed, filtered and dried to obtain in a powdery state. The graft ratio of the obtained graft copolymer was 38%, and the intrinsic viscosity of the methyl ethyl ketone soluble component was 0.33 dl/g.

<E-2>

Under the presence of a polybutadiene latex (average rubber particle diameter 0.09 μm) 75 wt parts (based on solid weight), 2 wt parts as solid component of MAA-BA copolymer was added and the mixture was aged by agitating for 30 minutes under room temperature, and a mixture of potassium oleate 1.5 wt parts and sodium formaldehyde sulfoxylate 0.6 wt parts was put in a flask and kept at 70° C. Then, methyl methacrylate 13 wt parts, n-butyl acrylate 2 wt parts and cumene hydroperoxide 0.03 wt part were dropped for one hour and left to stand for one hour. After that, under the presence of the polymer obtained in the previous stage, as second step, after a mixture of styrene 17 wt parts and cumene hydroperoxide 0.034 wt part was dropped for one hour, the reaction mixture was kept for 3 hours. After that, under the presence of the polymers obtained through the first and second steps, as third step, after a mixture of methyl methacrylate 3 wt parts and cumene hydroperoxide 0.003 wt parts was dropped for 0.5 hour, it was kept for one hour to complete the polymerization. After butylated hydroxytoluene 0.5 wt parts was added to the obtained copolymer latex, it was coagulated by sulfuric acid and then washed and dried to obtain in a powdery state. The graft ratio of the obtained graft copolymer was 26% and the intrinsic viscosity of the methyl ethyl ketone soluble component was 0.26 dl/g.

Reference Example 6

At Least One Thermoplastic Resin Selected from Aliphatic Polycarbonate, Aromatic Polyester, Polyethylene, Polypropylene and Polyvinylchloride (F)

<F-1>

"Carbodiol" 2000 produced by Toagosei Co., Ltd. (aliphatic polycarbonate)

<F-2>

"Toraycon" 1100S produced by Toray Industries, Inc. (polybutylene terephthalate)

<F-3>

"Corterra" CP509200 produced by Shell Chemicals Ltd. (polypropylene terephthalate)

<F-4>

"Hizex" 2200J produced by Mitsui Chemicals, Inc. (high density polyethylene)

<F-5>

"Noblen" Y101 produced by Sumitomo Chemical Co., Ltd. (polypropylene)

<F-6>

"Zest" 1300Z produced by Shin Dai-Ichi Vinyl Corp. (polyvinylchloride)

Reference Example 7

Antistatic Polymer (G)

<G-1>

Caprolactam 40 parts, polyethylene glycol of number average molecular weight 2,000 56.3 parts and terephthalic acid 4.8 parts together with an antioxidant (Irganox 1098) 0.2 wt part and antimony trioxide 0.1 wt part, were put into a reaction vessel equipped with a helical ribbon agitator, the inside was filled with nitrogen and the mixture was stirred and heated for 50 minutes at 260° C. while flowing a small amount of nitrogen to make a transparent uniform solution. Then the mixture was polymerized for 3 hours under the condition of 260° C. and 0.5 mmHg or lower to obtain a transparent polymer. The polymer was extruded on a cooling belt in a gut state and pelletized to thereby obtain a pellet-like polyether esteramide <G-1>.

The obtained polyether esteramide has a relative viscosity (ηr) measured in 0.5% concentration solution in o-chlorophenol at 25° C. of 2.01 and a volume resistivity of $1 \times 10^9$ Ωcm.
<G-2>

Caprolactam 90 parts, polyethylene glycol of number average molecular weight 2,000 9.4 parts and terephthalic acid 0.8 parts together with an antioxidant (Irganox 1098) 0.2 wt part and antimony trioxide 0.05 wt part, were put into a reaction vessel equipped with a helical ribbon agitator, and then, according to the steps of Reference example <G-1>, polyether esteramide <G-2> was prepared.

The obtained polyether esteramide has a relative viscosity (ηr) measured in 0.5% concentration solution in o-chlorophenol at 25° C. of 2.11 and a volume resistivity of $3 \times 10^{13}$ Ωcm.
<G-3>

Polyamide <G-3> was prepared by polymerizing caprolactam under pressure.

The obtained polyamide has a relative viscosity (ηr) measured in 0.5% concentration solution in o-chlorophenol at 25° C. of 2.10 and a volume resistivity of $5 \times 10^{14}$ Ωcm.

Reference Example 8

Nucleating Agent (H)

<H-1>
"LMS300" produced by Fuji Talc Industrial Co., Ltd. (talc; inorganic nucleating agent) was used.
<H-2>
"Slipax L" produced by Nippon Kasei Chemical Co., Ltd. (ethylene bislauric amide; organic nucleating agent) was used.

Reference Example 9

Plasticizer (I)

<I-1>
"PEG4000" produced by Sanyo Chemical Industries, Ltd. (polyethylene glycol) was used.

Reference Example 10

Filler (J)

<J-1>
"CS3J948" produced by Nitto Boseki Co., Ltd. (glass fiber) was used.

Reference Example 11

Carboxyl Group Reactive Molecular End Blocking Agent (K)

<K-1>
"Carbodilite" LA-1 produced by Nishinbo Industries, Inc. (carbodiimide) was used.

Reference Example 12

Other Thermoplastic Resin (L)

<L-1>
"576H" produced by BASF Japan (polystyrene: high impact grade) was used.
<L-2>
"Styrac 121" produced by Asahi Kasei Chemicals Corp. (ABS: standard grade) was used.

Examples 1 to 19 and Comparative Examples 1 to 7

After the starting materials described in Table 1 were dry-blended, they were melt-blended and pelletized by a twin screw extruder (TEX-30 produced by Japan Steel Works, Ltd.) heated to 220° C.

The pellets obtained in Examples 1 to 19 and Comparative examples 1 to 7 were injection molded using IS55EPN injection molding machine produced by Toshiba Machine Co., Ltd. under conditions at molding temperature of 230° C. and mold temperature of 40° C. and, as for the obtained test pieces, each characteristic was evaluated by the following methods.

[Tensile characteristics]: Evaluated according to ASTM D638.

[Impact resistance]: Impact resistance was evaluated according to ASTM D256-56A.

[Heat resistance]: Deflection temperature under load was measured according to ASTM D648 (load: 0.46 MPa).

[TEM observation]: An observation of morphology by transmission electron microscope (Hitachi Electron Microscope H-700) of cross section of the obtained resin composition was carried out and, based on photographs magnified 1,000 times (1 cm on the photograph corresponds to 1 μm), on arbitrarily selected 30 pieces of dispersed respective spherical particle phases taken in the photograph, longest diameters were measured and the number average thereof was defined as the average particle diameter.

The evaluation results of the tensile characteristics, impact resistance, heat resistance and TEM observation of respective samples were shown in Table 1.

TABLE 1

| | | | Examples | | | | | | | | | | |
|---|---|---|---|---|---|---|---|---|---|---|---|---|---|
| | | | 1 | 2 | 3 | 4 | 5 | 6 | 7 | 8 | 9 | 10 |
| Styrene-based resin | <A-1> | Wt parts | | | | | | | | | | |
| | <A-2> | | 59 | 58 | | | 59 | 59 | 59 | 60 | | |
| | <A-3> | | | | | | | | | | 60 | |
| | <A-4> | | | | | | | | | | | 60 |
| | <A-5> | | | | 44 | 29 | | | | | | |
| Aliphatic polyester | <B-1> | Wt parts | 41 | 42 | 56 | 71 | 41 | 41 | 41 | 40 | 40 | 40 |
| | Wt parts | Wt parts | | | | | | | | | | |
| Compatibilizer | <C-1-1> | Wt parts | 2 | 5 | 11 | 18 | | | | | | |
| | <C-1-2> | | | | | | | 2 | 2 | 2 | | |

TABLE 1-continued

|  |  |  |  |  |  |  |  |  |  |  |  |
|---|---|---|---|---|---|---|---|---|---|---|---|
|  | <C-2-1> |  |  |  |  |  |  |  |  |  |  |
|  | <C-2-2> |  |  |  |  |  |  |  |  |  |  |  |
| Dicarboxylic | <D-1> | Wt |  |  |  |  | 0.2 |  | 0.2 | 0.2 | 0.2 |
| anhydride | <D-2> | parts |  |  |  |  |  | 0.2 |  |  |  |
| Tensile characteristics | 3.2 mmt strength | MPa | 77 | 80 | 75 | 78 | 78 | 80 | 80 | 76 | 74 | 70 |
|  | 3.2 mmt elongation at break | % | 4 | 4 | 4 | 5 | 4 | 4 | 4 | 4 | 4 | 4 |
| Impact resistance | 3.2 mmt Izod | J/m | 30 | 30 | 26 | 27 | 30 | 30 | 29 | 25 | 27 | 26 |
| Heat resistance | High load (0.46 MPa) | ° C. | 83 | 81 | 75 | 65 | 84 | 86 | 85 | 82 | 88 | 85 |
| TEM observation | Average particle diameter | μm | 10 | 13 | 20 | 35 | 10 | 8 | 9 | 15 | 8 | 9 |

|  |  |  | Examples |  |  |  |  |  |  |  |  |
|---|---|---|---|---|---|---|---|---|---|---|---|
|  |  |  | 11 | 12 | 13 | 14 | 15 | 16 | 17 | 18 | 19 |
| Styrene-based resin | <A-1> | Wt parts |  |  |  |  |  |  |  |  | 60 |
|  | <A-2> |  |  | 60 | 59 | 60 |  |  |  |  |  |
|  | <A-3> |  |  |  |  |  |  |  |  |  |  |
|  | <A-4> |  |  |  |  |  |  |  |  |  |  |
|  | <A-5> |  | 60 |  |  |  | 60 | 60 | 60 | 60 |  |
| Aliphatic polyester | <B-1> Wt parts | Wt parts | 40 | 40 | 41 | 40 | 40 |  |  |  |  |
|  | Wt parts |  |  |  |  |  |  | 40 |  |  |  |
|  |  |  |  |  |  |  |  |  | 40 | 40 | 40 |
| Compatibilizer | <C-1-1> | Wt parts |  |  |  |  |  |  |  |  |  |
|  | <C-1-2> |  |  |  |  |  |  |  |  |  |  |
|  | <C-2-1> |  |  | 0.2 | 2.0 |  | 0.2 | 0.2 | 0.2 | 0.2 | 0.2 |
|  | <C-2-2> |  |  |  |  | 0.1 |  |  |  |  |  |
| Dicarboxylic anhydride | <D-1> | Wt parts | 0.2 |  |  |  |  |  |  | 0.2 | 0.2 |
|  | <D-2> |  |  |  |  |  |  |  |  |  |  |
| Tensile characteristics | 3.2 mmt strength | MPa | 70 | 72 | 70 | 73 | 75 | 75 | 76 | 76 | 74 |
|  | 3.2 mmt elongation at break | % | 4 | 4 | 4 | 4 | 4 | 4 | 4 | 4 | 4 |
| Impact resistance | 3.2 mmt Izod | J/m | 26 | 27 | 27 | 28 | 27 | 26 | 27 | 30 | 27 |
| Heat resistance | High load (0.46 MPa) | ° C. | 90 | 89 | 94 | 90 | 90 | 93 | 95 | 96 | 92 |
| TEM observation | Average particle diameter | μm | 8 | 8 | 5 | 7 | 7 | 5 | 5 | 5 | 6 |

|  |  |  | Comparative examples |  |  |  |  |  |  |
|---|---|---|---|---|---|---|---|---|---|
|  |  |  | 1 | 2 | 3 | 4 | 5 | 6 | 7 |
| Styrene-based resin | <A-1> | Wt parts |  |  |  |  |  |  |  |
|  | <A-2> |  | 60 |  |  |  |  |  |  |
|  | <A-3> |  |  |  |  |  |  |  |  |
|  | <A-4> |  |  |  |  |  |  |  |  |
|  | <A-5> |  |  | 60 | 50 | 40 |  |  |  |
| Aliphatic polyester | <B-1> | Wt parts | 40 | 40 | 50 | 60 | 100 | 100 | 100 |
|  | <B-2> |  |  |  |  |  |  |  |  |
|  | <B-3> |  |  |  |  |  |  |  |  |
| Compatibilizer | <C-1-1> | Wt parts |  |  |  |  |  |  |  |
|  | <C-1-2> |  |  |  |  |  |  | 2 |  |
|  | <C-2-1> |  |  |  |  |  |  |  |  |
|  | <C-2-2> |  |  |  |  |  |  |  | 0.1 |
| Dicarboxylic anhydride | <D-1> | Wt parts |  |  |  |  |  |  |  |
|  | <D-2> |  |  |  |  |  |  |  |  |
| Tensile characteristics | 3.2 mmt strength | MPa | 73 | 72 | 58 | 59 | 65 | 66 | 65 |
|  | 3.2 mmt elongation at break | % | 3 | 3 | 2 | 2 | 4 | 4 | 4 |
| Impact resistance | 3.2 mmt Izod | J/m | 19 | 19 | 18 | 19 | 25 | 25 | 25 |
| Heat resistance | High load (0.46 MPa) | ° C. | 80 | 81 | 72 | 60 | 55 | 55 | 55 |
| TEM observation | Average particle diameter | μm | 125 | 115 | 130 | 110 | — | — | — |

From Examples 1 to 19 and Comparative examples 1 to 7, it was found that the resin composition of the present invention is excellent in tensile strength, impact resistance and heat resistance.

Example 20 to 42 and Comparative Examples 8 to 13

After the starting materials described in Tables 2 and 3 were dry-blended, they were melt-blended and pelletized by a twin screw extruder (TEX-30 produced by Japan Steel Works, Ltd.) heated to 220° C.

The pellets obtained in Examples 20 to 36 and Comparative examples 8 to 13 were injection molded using IS55EPN injection molding machine produced by Toshiba Machine Co., Ltd. under conditions at molding temperature of 230° C. and mold temperature of 40° C. and, as for the obtained test pieces, the respective characteristics were evaluated by the following methods. The pellets obtained in Examples 37 to 41 were molded, and evaluated in the same way except changing to the conditions of molding temperature 230° C. and mold temperature 85° C.

[Tensile characteristics]: Evaluated according to ASTM D638.

[Impact resistance]: Impact resistance was evaluated according to ASTM D256-56A

[Heat resistance]: Deflection temperature under load was measured according to ASTM D648 (load: 0.46 MPa).

[Flowability]: The flowability was evaluated by the lowest filling pressure (gauge pressure) at injection molding. As the filling pressure is lower, the flowability is better.

[Areal ratio]: As for a molded article obtained by injection molding, the styrene-based resin (A), the vinyl-based polymer (C-2), the graft polymer (C-3) and the rubbery polymer (E) were dyed by osmium block dyeing method and then an ultra-thin test piece was cut out and the cross section magnified 6000 times was observed and taken into a photograph by a transmission electron microscope. And further, the photograph was magnified 4 times and the area (X) of (C-2), (C-3) and (E) dispersed in the polyester (B) and the area (Y) of (C-2), (C-3) and (E) dispersed in the styrene resin (A) were cut out from the photograph and determined by the weight method, and the areal ratio was determined by the formula, (X)/((X)+(Y)).

The evaluation results of the tensile characteristics, impact resistance, heat resistance, flowability and areal ratio of the respective samples were respectively shown in Table 2 and Table 3.

TABLE 2

| | | | Examples | | | | | | | | | | | |
|---|---|---|---|---|---|---|---|---|---|---|---|---|---|---|
| | | | 20 | 21 | 22 | 23 | 24 | 25 | 26 | 27 | 28 | 29 | 30 | 31 |
| Styrene-based resin | <A-1> | Wt parts | 57 | | | | | | | | | | | |
| | <A-2> | | | 54 | 54 | 54 | 54 | 54 | | 23 | | | | 29 |
| | <A-3> | | | | | | | | 54 | | | | | |
| | <A-4> | | | | | | | | | | 31 | | | |
| | <A-5> | | | | | | | | | | | 54 | 54 | 54 | |
| Aliphatic polyester | <B-1> | Wt Parts | 43 | 46 | 46 | 46 | 46 | 46 | 46 | 46 | 46 | 46 | 46 | 71 |
| | <B-2> | | | | | | | | | | | | | |
| | <B-3> | | | | | | | | | | | | | |
| Compatibilizer | <C-1-1> | Wt parts | 7 | 8 | 8 | 8 | 8 | 8 | 8 | 8 | 8 | 8 | 8 | 7 |
| | <C-1-2> | | | | | | | | | | | | | |
| | <C-2-1> | | | | | | | | | | | | | |
| | <C-3-1> | | | | 46 | | | | | 46 | 46 | 46 | 46 | 46 | |
| | <C-3-2> | | | 36 | | 46 | | | | | | | | | |
| | <C-3-3> | | | | | | 46 | | | | | | | | 36 |
| Dicarboxylic anhydride | <D-1> | Wt parts | | | | | | 0.3 | | | 0.3 | | | | |
| | <D-2> | | | | | | | | | | | | 0.3 | | |
| Rubbery polymer | <E-1> | Wt parts | | | | | 46 | 46 | | | | | | | |
| Other thermoplastic resin | <L-1> | Wt parts | | | | | | | | | | | | | |
| | <L-2> | | | | | | | | | | | | | | |
| Tensile characteristics | 3.2 mmt strength | MPa | 35 | 50 | 52 | 53 | 53 | 55 | 50 | 48 | 55 | 57 | 56 | 51 |
| | 3.2 mmt Elongation at break | % | 9 | 12 | 15 | 18 | 14 | 15 | 16 | 11 | 14 | 20 | 15 | 11 |
| Impact resistance | 3.2 mmt Izod | J/m | 85 | 180 | 220 | 279 | 56 | 68 | 229 | 145 | 160 | 240 | 200 | 265 |
| Heat resistance | Low load (0.46 MPa) | ° C. | 75 | 84 | 87 | 88 | 93 | 95 | 85 | 91 | 89 | 90 | 90 | 67 |
| Flowability | Gauge pressure | MPa | 1.6 | 1.4 | 1.4 | 1.4 | 1.4 | 1.9 | 1.3 | 1.6 | 1.2 | 1.8 | 1.7 | 1.4 |
| Areal ratio of (C-2) + (C-3) + (E) in aliphatic polyester | | % | 43 | 60 | 62 | 68 | 16 | 25 | 62 | 55 | 58 | 61 | 59 | 64 |

| | | | Examples | | | | | Comparative examples | | | | | |
|---|---|---|---|---|---|---|---|---|---|---|---|---|---|
| | | | 32 | 33 | 34 | 35 | 36 | 8 | 9 | 10 | 11 | 12 | 13 |
| Styrene-based resin | <A-1> | Wt parts | | | | | | | | | | | |
| | <A-2> | | 54 | 54 | 57 | 57 | | | | | | | |
| | <A-3> | | | | | | | | | | | | |
| | <A-4> | | | | | | | | | | | | |
| | <A-5> | | | | | | 57 | | | | | | |

TABLE 2-continued

| | | | | | | | | | | | | | | |
|---|---|---|---|---|---|---|---|---|---|---|---|---|---|---|
| Aliphatic polyester | <B-1> | Wt Parts | | 46 | 46 | | | | | 100 | 100 | 100 | 100 |
| | <B-2> | | 46 | | | | | | | | | | |
| | <B-3> | | | | | 43 | 43 | | | | | | |
| Compatibilizer | <C-1-1> | Wt parts | 8 | | | 7 | 6 | | | | | | |
| | <C-1-2> | | | 8 | | | | | | | | | |
| | <C-2-1> | | | | | | 1 | | | | | | |
| | <C-3-1> | | 46 | 46 | 43 | 21 | 36 | | | | 25 | | |
| | <C-3-2> | | | | | | | | | | | | |
| | <C-3-3> | | | | | | | | | | | | |
| Dicarboxylic anhydride | <D-1> | Wt parts | | | | 0.3 | 0.3 | | | | | | |
| | <D-2> | | | | | | | | | | | | |
| Rubbery polymer | <E-1> | Wt parts | | | | 14 | | | | | | | |
| Other thermoplastic resin | <L-1> | Wt parts | | | | | | 100 | | | 233 | | |
| | <L-2> | | | | | | | | 100 | | | | 233 |
| Tensile characteristics | 3.2 mmt strength | MPa | 50 | 51 | 44 | 50 | 50 | 31 | 43 | 65 | 48 | 29 | 45 |
| | 3.2 mmt Elongation at break | % | 14 | 12 | 5 | 30 | 15 | 15 | 9 | 4 | 14 | 6 | 5 |
| Impact resistance | 3.2 mmt Izod | J/m | 225 | 183 | 78 | 300 | 310 | 105 | 195 | 25 | 121 | 41 | 45 |
| Heat resistance | Low load (0.46 MPa) | °C. | 83 | 87 | 74 | 88 | 93 | 81 | 89 | 55 | 53 | 73 | 75 |
| Flowability | Gauge pressure | MPa | 1.6 | 1.8 | 1.8 | 2.3 | 2.4 | 2.7 | 3.0 | 1.5 | 1.8 | 2.2 | 2.4 |
| Areal ratio of (C-2) + (C-3) + (E) in aliphatic polyester | | % | 62 | 59 | 11 | 70 | 75 | — | — | — | 100 | — | — |

TABLE 3

| | | | Examples | | | | |
|---|---|---|---|---|---|---|---|
| | | | 37 | 38 | 39 | 40 | 41 |
| Styrene-based resin | <A-2> | Wt parts | 29 | 29 | 28 | 29 | 29 |
| Aliphatic polyester | <B-1> | Wt parts | 71 | 71 | 72 | 71 | 71 |
| Compatibilizer | <C-1-1> | Wt parts | 7 | 7 | 7 | 7 | 7 |
| | <C-3-3> | | 36 | 36 | 36 | 36 | 36 |
| Dicarboxylic anhydride | <D-1> | Wt parts | | | 0.3 | | |
| Nucleating agent | <H-1> | Wt parts | 3 | | | 3 | 3 |
| | <H-2> | | | 3 | 3 | | |
| Plasticizer | <I-1> | Wt parts | 3 | 3 | 3 | 3 | 3 |
| Filler | <J-1> | Wt parts | | | | 29 | |
| Enc blocking agent | <K-1> | Wt parts | | | | | 1 |
| Tensile characteristics | 3.2 mmt strength | MPa | 52 | 52 | 52 | 77 | 53 |
| | 3.2 mmt Elongation at break | % | 9 | 14 | 14 | 4 | 21 |
| Impact resistance | 3.2 mmt Izod | J/m | 225 | 284 | 310 | 98 | 303 |
| Weather resistance | Low load (0.46 MPa) | °C. | 78 | 75 | 80 | 145 | 79 |
| Areal ratio of (C-2) + (C-3) + (E) in aliphatic polyester | | % | 65 | 67 | 73 | 58 | 70 |

As for Example 29, when the TEM observation was carried out as well as example 1 the average particle diameter of the dispersed phase was 200 nm.

By Examples 20 to 41 and Comparative examples 8 to 13, it was found that the resin composition of the present invention is excellent in tensile characteristics, impact resistance, heat resistance and flowability.

Examples 42 to 54

After the starting materials described in Tables 4 and 5 were dry-blended, they were melt-blended and pelletized by a twin screw extruder (TEX-30 produced by Japan Steel Works, Ltd.) heated to 220° C.

The pellets obtained in Examples 42 to 51 were injection molded using IS55EPN injection molding machine produced by Toshiba Machine Co., Ltd. under conditions at molding temperature of 230° C. and mold temperature 40° C. and, as for the obtained test pieces, the respective characteristics were evaluated by the following methods. The pellets obtained in Examples 52 to 54 were molded and evaluated in the same way except changing to the conditions of molding temperature 230° C. and mold temperature 80° C.

[Tensile characteristics]: Evaluated according to ASTM D638.

[Impact resistance]: Impact resistance was evaluated according to ASTM D256-56A

[Heat resistance]: Deflection temperature under load was measured according to ASTM D648 (load: 0.46 MPa).

[Flowability]: The flowability was evaluated based on the lowest filling pressure (gauge pressure) at injection molding. As the filling pressure is lower, the flowability is better.

[Areal ratio]: As for a molded article obtained by an injection molding, the styrene-based resin (A), the vinyl-based polymer (C-2), the graft polymer (C-3) and the rubbery polymer (E) were dyed by osmium block dyeing method and then an ultra-thin test piece was cut out and the cross section magnified 6000 times was observed and was taken into a photograph by a transmission electron microscope. And further, the photograph was magnified 4 times and the area (X) of (C-2), (C-3) and (E) dispersed in the polyester (B) and the area (Y) of (C-2), (C-3) and (E) dispersed in the styrene resin (A) were cut out from the photograph and determined by the weight method, and the areal ratio was determined by the formula, (X)/((X)+(Y)).

The evaluation results of the tensile characteristics, impact resistance, heat resistance, flowability and areal ratio of the respective samples were respectively shown in Table 4 and Table 5.

TABLE 4

| | | | Examples | | | | | | | | | |
|---|---|---|---|---|---|---|---|---|---|---|---|---|
| | | | 42 | 43 | 44 | 45 | 46 | 47 | 48 | 49 | 50 | 51 |
| Styrene-based resin | <A-1> | Wt parts | 57 | | | | | | | | | |
| | <A-2> | | | 57 | 57 | 57 | 57 | | 57 | 33 | | |
| | <A-3> | | | | | | | 57 | | | | |
| | <A-4> | | | | | | | | | | | |
| | <A-5> | | | | | | | | | | 57 | 57 |
| Aliphatic polyester | <B-3> | Wt parts | 43 | 43 | 43 | 43 | 43 | 43 | 43 | 67 | 43 | 43 |
| Compatibilizer | <C-2-1> | Wt parts | | | | | | | | | 0.3 | 0.3 |
| | <C-2-3> | | | 14 | 14 | | | 14 | 14 | 13 | | |
| | <C-2-4> | | | | | 14 | 14 | | | 14 | | |
| | <C-3-1> | | | | 29 | 29 | | | 29 | | 43 | 43 |
| | <C-3-2> | | 29 | | | | | | | | | |
| | <C-3-3> | | | | | | 29 | | | 20 | | |
| Dicarboxylic anhydride | <D-1> | Wt parts | | | | | | | | | 0.3 | |
| | <D-2> | Wt parts | | | | | | | | | | 0.3 |
| Rubbery polymer | <E-1> | Wt parts | | | | | | 29 | | 29 | | |
| Tensile characteristics | 3.2 mmt strength | MPa | 32 | 47 | 48 | 50 | 47 | 51 | 48 | 49 | 45 | 45 |
| | 3.2 mmt Elongation at break | % | 17 | 18 | 15 | 12 | 15 | 27 | 21 | 27 | 10 | 9 |
| Impact resistance | 3.2 mmt Izod | J/m | 110 | 195 | 201 | 185 | 155 | 178 | 140 | 250 | 170 | 160 |
| Heat resistance | High load (1.82 MPa) | °C. | 71 | 80 | 78 | 80 | 78 | 81 | 80 | 64 | 84 | 82 |
| Flowability | Gauge pressure | MPa | 1.7 | 1.7 | 1.6 | 1.6 | 1.7 | 1.6 | 1.7 | 1.4 | 2.2 | 2.0 |
| Areal ratio of (C-2) + (C-3) + (E) in aliphatic polyester | | % | 38 | 39 | 44 | 43 | 27 | 41 | 25 | 56 | 55 | 53 |

TABLE 5

| | | | Examples | | |
|---|---|---|---|---|---|
| | | | 52 | 53 | 54 |
| Styrene-based resin | <A-2> | Wt parts | 33 | 33 | 33 |
| Aliphatic polyester | <B-3> | | 67 | 67 | 67 |
| Compatibilizer | <C-2-1> | | 13 | 13 | 13 |
| Rubbery polymer | <E-1> | | 20 | 20 | 20 |
| Nucleating agent | <H-1> | | 3 | | 3 |
| | <H-2> | | | 3 | |
| Plasticizer | <I-1> | | 3 | 3 | 3 |
| End blocking agent | <K-1> | | | | 1 |
| Tensile characteristics | 3.2 mmt strength | MPa | 51 | 50 | 50 |
| | 3.2 mmt elongation at break | % | 16 | 21 | 35 |
| Impact resistance | 3.2 mmt Izod | J/m | 175 | 220 | 215 |
| Heat resistance | Low load (0.46 MPa) | °C. | 78 | 76 | 76 |
| Areal ratio of (C-2) + (C-3) + (E) in aliphatic polyester | | % | 35 | 38 | 38 |

From Examples 42 to 54, it was found that the resin composition of the present invention is excellent in tensile characteristics, impact resistance, heat resistance and flowability.

Examples 55 to 72 and Comparative Examples 14 to 16

After the starting materials described in Table 6 were dry-blended, they were melt-blended and pelletized by a twin screw extruder (PCM-30 produced by Ikegai Corp.) heated to 220° C.

The pellets obtained in Examples 55 to 69 and Comparative examples 14 to 16 were injection molded using IS55EPN injection molding machine produced by Toshiba Machine Co., Ltd. under conditions at molding temperature of 230° C. and mold temperature 40° C. and, as for the obtained test pieces, the respective characteristics were evaluated by the following methods. The pellets obtained in Examples 70 to 72 were molded and evaluated in the same way except changing to the conditions of molding temperature 230° C. and mold temperature 80° C.

[Impact resistance]: Impact resistance was evaluated according to ASTM D256-56A

[Heat resistance]: Deflection temperature under load was measured according to ASTM D648 (load: 1.82 MPa).

[Areal ratio]: As for a molded article obtained by an injection molding, the styrene-based resin (A), the graft polymer (C-3) and the rubbery polymer (E) were dyed by osmium block dyeing method and then an ultra-thin test piece was cut out and the cross section magnified 6000 times was observed and taken into a photograph by a transmission electron microscope. And further, the photograph was magnified 4 times and the area (X) of (C-3) and (E) dispersed in the polyester (B) and the area (Y) of (C-3) and (E) dispersed in the styrene resin (A) were cut out from the photograph and determined by the weight method, and the areal ratio was determined by the formula, (X)/((X)+(Y)).

The evaluation results of the impact resistance, heat resistance and areal ratio of the respective samples were respectively shown in Table 6.

As for Example 58, when the TEM observation was carried out as well as example 1 the average particle diameter of the dispersed phase was 220 nm.

From Examples 55 to 72, by adding the styrene-based resin, the aliphatic polyester and at least one selected from the compatibilizer and the dicarboxylic anhydride to the polylactide alone (Comparative example 15), the resin composition of the present invention can be greatly improved in impact resistance and can have a practical heat resistant temperature.

In particular, from Examples 55 to 59, it was found that the impact resistance is more improved as the ratio of (C-3) and (E) present in the aliphatic polyester increases more.

TABLE 6

|  |  |  | Examples |  |  |  |  |  |  |  |  |  |  |
|---|---|---|---|---|---|---|---|---|---|---|---|---|---|
|  |  |  | 55 | 56 | 57 | 58 | 59 | 60 | 61 | 62 | 63 | 64 | 65 |
| Styrene-based resin | <A-1> | Wt parts |  |  |  |  |  | 57 |  |  |  |  |  |
|  | <A-2> |  | 57 | 57 | 57 | 57 | 57 |  |  | 29 | 71 | 43 | 36 |
|  | <A-3> |  |  |  |  |  |  |  | 57 |  |  |  |  |
|  | <A-4> |  |  |  |  |  |  |  |  | 29 |  |  |  |
|  | <A-5> |  |  |  |  |  |  |  |  |  |  |  |  |
| Aliphatic polyester | <B-3> | Wt parts | 43 | 43 | 43 | 43 | 43 | 43 | 43 | 43 | 29 | 57 | 64 |
| Compatibility improver | <C-3-1> | Wt parts | 43 |  |  |  |  |  |  |  |  |  |  |
|  | <C-3-2> |  |  | 43 |  |  |  |  |  |  |  |  |  |
|  | <C-3-3> |  |  |  | 43 | 43 |  | 43 | 43 | 43 | 43 | 43 | 43 |
| Dicarboxylic anhydride | <D-1> | Wt parts |  |  |  |  | 0.3 | 0.3 |  |  |  |  |  |
|  | <D-2> |  |  |  |  |  |  |  |  |  |  |  |  |
| Rubbery polymer | <E-1> | Wt parts |  |  |  |  | 43 |  |  |  |  |  |  |
| Nucleating agent | <H-1> | Wt parts |  |  |  |  |  |  |  |  |  |  |  |
|  | <H-2> |  |  |  |  |  |  |  |  |  |  |  |  |
| Filler | <J-1> |  |  |  |  |  |  |  |  |  |  |  |  |
| Impact resistance | 3.2 mmt Izod | J/m | 80 | 130 | 200 | 320 | 50 | 170 | 220 | 160 | 190 | 220 | 220 |
| Heat resistance | High load (1.82 MPa) | ° C. | 75 | 72 | 70 | 74 | 79 | 71 | 67 | 85 | 75 | 67 | 63 |
| Areal ratio of (C-2) + (C-3) + (E) in aliphatic polyester |  | % | 23 | 38 | 60 | 64 | 8 | 65 | 48 | 57 | 48 | 71 | 78 |

|  |  |  | Examples |  |  |  |  |  |  | Comparative examples |  |  |
|---|---|---|---|---|---|---|---|---|---|---|---|---|
|  |  |  | 66 | 67 | 68 | 69 | 70 | 71 | 72 | 14 | 15 | 16 |
| Styrene-based resin | <A-1> | Wt parts |  |  |  |  |  |  |  | 100 |  |  |
|  | <A-2> |  | 21 |  |  |  | 57 | 57 | 57 |  |  |  |
|  | <A-3> |  |  |  |  |  |  |  |  |  |  |  |
|  | <A-4> |  |  |  |  |  |  |  |  |  |  |  |
|  | <A-5> |  |  | 57 | 57 | 57 |  |  |  |  |  |  |
| Aliphatic polyester | <B-3> | Wt parts | 79 | 43 | 43 | 43 | 43 | 43 | 43 |  | 100 | 100 |
| Compatibility improver | <C-3-1> | Wt parts |  |  |  |  |  |  |  |  |  |  |
|  | <C-3-2> |  |  |  |  |  |  |  |  |  | 43 |  |
|  | <C-3-3> |  |  | 43 | 43 | 43 | 43 | 43 | 43 |  |  | 10 |
| Dicarboxylic anhydride | <D-1> | Wt parts |  |  |  | 0.3 |  |  |  |  |  |  |
|  | <D-2> |  |  |  |  | 0.3 |  |  |  |  |  |  |
| Rubbery polymer | <E-1> | Wt parts |  |  |  |  |  |  |  |  |  |  |
| Nucleating agent | <H-1> | Wt parts |  |  |  |  |  | 3 |  | 3 |  |  |
|  | <H-2> |  |  |  |  |  |  |  | 3 |  |  |  |
| Filler | <J-1> |  |  |  |  |  |  |  | 29 |  |  |  |
| Impact resistance | 3.2 mmt Izod | J/m | 250 | 150 | 250 | 200 | 180 | 190 | 90 | 230 | 20 | 180 |
| Heat resistance | High load (1.82 MPa) | ° C. | 58 | 80 | 85 | 82 | 81 | 76 | 101 | 90 | 53 | 54 |
| Areal ratio of (C-2) + (C-3) + (E) in aliphatic polyester |  | % | 85 | 60 | 66 | 63 | 58 | 55 | 51 | — | — | 100 |

Examples 73 to 78 and Comparative Examples 17 to 19

As for Examples 73 to 78 and Comparative example 17, the starting materials described in Table 7 were dry-blended and melt-blended at 220° C. for 15 minutes using a small type Brabender equipment produced by Toyo Seiki Seisaku-sho, Ltd., and, in nitrogen flow, put into a small type twin screw mixing extruder equipped with a 3 mmφ nozzle, extruded in a strand state at melting temperature of the resin, cooled by air and cut to pelletize, and the obtained pellet was melt-pressed at 200° C. to obtain a colorless transparent film of 20 μm thickness. A dynamic viscoelasticity test was carried out to the obtained film and the results are shown in Table 7.

In Comparative example 18, using the starting materials described in Table 7, a colorless transparent film of 20 μm thickness was obtained by melt-pressing at 200° C. A dynamic viscoelasticity test was carried out to the obtained film and the results are shown in Table 7.

In Comparative example 19, using the starting materials described in Table 7, a transparent film of 20 μm thickness was obtained by melt-pressing at 230° C. A dynamic viscoelasticity test was carried out to the obtained film and the results are shown in Table 7.

[Dynamic viscoelasticity]: As the dynamic viscoelasticity, using viscoelasticity measurement equipment DMS6100 (produced by Seiko Instruments Inc.), loss modulus of elasticity of 20 μm thickness film when it is heated from 0° C. to 220° C. in nitrogen at a rate of 2° C./min. was measured and modulus at 30° C. and temperature at which the modulus is decreased to a half value of modulus at start, were measured.

[TEM observation]: An observation of morphology by transmission electron microscope (Hitachi Electron Microscope H-700) on cross section of the obtained resin composition was carried out and, based on a photograph magnified 1,000 times (1 cm on the photograph corresponds to 1 μm), on arbitrarily selected 30 pieces of dispersed spherical particle phases taken in the photograph, the respective longest diameters were measured and the number average thereof is defined as the average particle diameter.

diameter finer, and modulus and heat resistance are also improved (Examples 73 to 78).

If the block copolymer is not mixed, the improvement of compatibility is not observed and modulus and heat resistance decreases than those of prior art, and a course distribution brings about disadvantageous effect (Comparative example 18 to 19).

Examples 79 to 97 and Comparative Examples 20 to 22

After the starting materials described in Tables 8 and 9 were dry-blended, they were melt-blended and pelletized by a twin screw extruder (PCM-30 produced by Ikegai Corp.) heated to 220° C.

The pellets obtained in Examples 78 to 94 and Comparative examples 20 to 22 were injection molded using IS55EPN injection molding machine produced by Toshiba Machine Co., Ltd. under conditions at molding temperature of 230° C. and mold temperature of 40° C. and, as for the obtained test pieces, the respective characteristic was evaluated by the following methods. The pellets obtained in Examples 95 to 97 were molded and evaluated in the same way except changing to the conditions of molding temperature 230° C. and mold temperature 80° C.

[Impact resistance]: Impact resistance was evaluated according to ASTM D256-56A

[Heat resistance]: Deflection temperature under load was measured according to ASTM D648 (load: 1.82 MPa).

[Areal ratio]: As for a molded article obtained by an injection molding, the styrene-based resin (A), the graft polymer (C-3) and the rubbery polymer (E) were dyed by osmium block dyeing method and then an ultra-thin test piece was cut out and the cross section magnified 6000 times was observed and taken into a photograph by a transmission electron microscope. And further, the photograph was magnified 4 times and the area (X) of (C-3) and (E) dispersed in the polyester (B) and the area (Y) of (C-3) and (E) dispersed in the styrene resin

TABLE 7

|  |  |  | Examples |  |  |  |  |  | Comparative examples |  |  |
|---|---|---|---|---|---|---|---|---|---|---|---|
|  |  |  | 73 | 74 | 75 | 76 | 77 | 78 | 17 | 18 | 19 |
| Styrene-based resin | <A-6> | Wt parts | 50 | 71 | 29 | 50 | 50 | 50 | 50 |  | 100 |
| Aliphatic polyester | <B-3> | Wt parts | 50 | 29 | 71 | 50 | 50 | 50 | 50 | 100 |  |
| Compatibilizer | <C-4-1> | Wt parts | 5 | 5 | 5 |  |  |  |  |  |  |
|  | <C-4-2> |  |  |  |  | 1 | 5 | 10 |  |  |  |
| Viscoelasticity test | At 30° C. | GPa | 3.8 | 3.5 | 3.9 | 3.2 | 3.7 | 3.8 | 1.6 | 3.9 | 2.9 |
| Los modulus of elasticity | 50% modulus temperature | ° C. | 98 | 103 | 93 | 89 | 99 | 100 | 56 | 56 | 101 |
| Glass transition temperature (DSC) | Tg | ° C. | 68 / 105 | 63 / 107 | 63 / 103 | 62 / 106 | 64 / 105 | 63 / 103 | 62 / 106 | 62 | 107 |
| TEM observation | Average particle diameter | μm | 4 | 5 | 4 | 8 | 4 | 4 | 128 | — |  |

From these results, the following facts are obvious.

By adding a block copolymer of polylactide and the styrene-based resin used to the mixture of the styrene-based resin and the aliphatic polyester, the compatibility is improved and, compared to the case in which the block polymer is not added (Comparative example 17), polymer particle of island structure is made finer to make the average particle (A) were cut out from the photograph and determined by the weight method, and the areal ratio was determined by the formula, (X)/((X)+(Y)).

The evaluation results of the impact resistance, heat resistance and areal ratio of (C-3) and (E) present in the aliphatic polyester of the respective sample was respectively shown in Tables 8 and 9.

TABLE 8

| | | | Examples | | | | | | | | | | | | | | | |
|---|---|---|---|---|---|---|---|---|---|---|---|---|---|---|---|---|---|---|
| | | | 79 | 80 | 81 | 82 | 83 | 84 | 85 | 86 | 87 | 88 | 89 | 90 | 91 | 92 | 93 |
| Styrene-based resin | <A-1> | Wt parts | | | | | | | | | | | 50 | | | | |
| | <A-2> | | 50 | 50 | 50 | 50 | 50 | 50 | 50 | 50 | 50 | 50 | | | 60 | 33 | 25 |
| | <A-4> | | | | | | | | | | | | | 50 | | | |
| Aliphatic polyester | <B-3> | Wt parts | 50 | 50 | 50 | 50 | 50 | 50 | 50 | 50 | 50 | 50 | 50 | 50 | 40 | 67 | 75 |
| Compatibilizer | <C-3-1> | Wt parts | | | | | | | | 50 | | | | | | | |
| | <C-3-2> | | | | | | | | | | 50 | | | | | | |
| | <C-3-3> | | 50 | 50 | 50 | 50 | 50 | 50 | 50 | | | | 50 | 50 | 60 | 50 | 50 |
| Dicarboxylic anhydride | <D-1> | Wt parts | | | | 0.3 | | | | | | 0.3 | | | | | |
| Rubbery polymer | <E-1> | Wt parts | | | | | | | | | 50 | | | | | | |
| Thermoplastic resin | <F-1> | Wt parts | 17 | | | | | | | | | | | | | | |
| | <F-2> | | | 17 | | | | | | | | | | | | | |
| | <F-3> | | | | 17 | 17 | | | | 17 | 17 | 17 | 17 | 17 | 40 | 17 | 17 |
| | <F-4> | | | | | | 17 | | | | | | | | | | |
| | <F-5> | | | | | | | 17 | | | | | | | | | |
| | <F-6> | | | | | | | | 17 | | | | | | | | |
| Impact resistance | 3.2 mmt Izod | J/m | 190 | 170 | 180 | 280 | 150 | 160 | 150 | 70 | 128 | 49 | 160 | 200 | 170 | 200 | 201 |
| Heat resistance | High load (1.82 MPa) | °C. | 65 | 72 | 70 | 73 | 66 | 65 | 60 | 74 | 71 | 78 | 68 | 69 | 73 | 65 | 61 |
| Areal ratio of (C-2) + (C-3) + (E) in aliphatic polyester | | % | 58 | 57 | 55 | 59 | 60 | 61 | 60 | 21 | 36 | 7 | 63 | 46 | 47 | 70 | 76 |

TABLE 9

| | | | Examples | | | | Comparative examples | | |
|---|---|---|---|---|---|---|---|---|---|
| | | | 94 | 95 | 96 | 97 | 20 | 21 | 22 |
| Styrene-based resin | <A-1> | Wt parts | | | | | | | |
| | <A-2> | | 8 | 50 | 50 | 50 | 10 | | |
| | <A-4> | | | | | | | | |
| Aliphatic polyester | <B-3> | Wt parts | 92 | 50 | 50 | 50 | | 100 | 100 |
| Compatibility improver | <C-3-1> | Wt parts | | | | | | | |
| | <C-3-2> | | | | | | | | |
| | <C-3-3> | | 50 | 50 | 50 | 50 | | | |
| Rubbery polymer | <E-1> | Wt parts | | | | | 43 | | |
| | <E-2> | | | | | | | | 11 |
| Thermoplastic resin | <F-1> | Wt parts | | | | | | | |
| | <F-2> | | | | | | | | |
| | <F-3> | | 17 | 17 | 17 | 17 | | | |
| | <F-4> | | | | | | | | |
| | <F-5> | | | | | | | | |
| | <F-6> | | | | | | | | |
| Nucleating agent | <H-1> | Wt parts | | 3 | | 3 | | | |
| | <H-2> | | | | 3 | | | | |
| Filler | <J-1> | Wt parts | | | | 33 | | | |
| Impact resistance | 3.2 mmt Izod | J/m | 240 | 170 | 180 | 80 | 230 | 20 | 180 |
| Heat resistance | High load (1.82 MPa) | °C. | 58 | 83 | 79 | 104 | 90 | 53 | 54 |
| Areal ratio of (C-2) + (C-3) + (E) in aliphatic polyester | | % | 84 | 59 | 56 | 52 | — | — | 100 |

From Examples 79 to 97, by adding the styrene-based resin, the aliphatic polyester and at least one selected from the compatibilizer and the dicarboxylic anhydride, the resin composition of the present invention can be greatly improved in impact resistance and can have a practical heat resistant temperature compared to the polylactide alone (Comparative example 21).

In particular, from Examples 81, 82 and 86 to 88, it was found that the impact resistance is more improved as the ratio of (C-3) and (E) present in the aliphatic polyester increases more.

Examples 98 to 112 and Comparative Examples 23 to 29

After the starting materials described in Tables 10 and 11 were dry-blended, they were melt-blended and pelletized by a twin screw extruder (PCM-30 produced by Ikegai Corp.) heated to 220° C.

The pellets obtained in Examples 98 to 109 and Comparative examples 23 to 29 were injection molded using IS55EPN injection molding machine produced by Toshiba Machine Co., Ltd. under conditions at molding temperature of 230° C.

and mold temperature of 40° C. and, as for the obtained test pieces, the respective characteristic was evaluated by the following methods. The pellets obtained in Examples 110 to 112 were molded and evaluated in the same way except changing to the conditions of molding temperature 230° C. and mold temperature 80° C.

[Impact resistance]: Impact resistance was evaluated according to ASTM D256-56A

[Heat resistance]: Deflection temperature under load was measured according to ASTM D648 (load: 1.82 MPa).

[Antistaticity]: Surface specific resistance value: it was measured by using a disc of 2 mmt×40 mmϕ according to the conditions mentioned below. At the measurement, super insulation resistance checker SM-10 produced by Toa Denpa Kogyo, Ltd. was used.

(1) Just after molding, the test piece was washed with an aqueous solution of a detergent, "Mama Royal" (produced by Lion Corp.), and successively, sufficiently washed with distilled water and after surface water was removed, the measurement was carried out under the atmosphere of 23° C., 50% RH.

(2) After molding and after leaving 100 days under 23° C., 50% RH, the test piece was washed with aqueous solution of a detergent, "Mama Royal" (produced by Lion Corp.), and successively, sufficiently washed with distilled water and after surface water was removed, the measurement was carried out under the atmosphere of 23° C., 50% RH.

[Areal ratio]: For a molded article obtained by an injection molding, the styrene-based resin (A), the graft polymer (C-3) and the rubbery polymer (E) were dyed by osmium block dyeing method and then an ultra-thin test piece was cut out and the cross section magnified 6000 times was observed and taken into a photograph by a transmission electron microscope. And further, the photograph was magnified 4 times and the area (X) of (C-3) and (E) dispersed in the polyester (B) and the area (Y) of (C-3) and (E) dispersed in the styrene resin (A) were cut out from the photograph and determined by the weight method, and the areal ratio was determined by the formula, (X)/((X)+(Y)).

The evaluation results of the impact resistance, heat resistance, antistaticity and areal ratio of (C-3) and (E) present in the aliphatic polyester of the respective samples were respectively shown in Tables 10 and 11.

TABLE 10

|  |  |  | Examples | | | | | |
|---|---|---|---|---|---|---|---|---|
|  |  |  | 98 | 99 | 100 | 101 | 102 | 103 |
| Styrene-based resin | <A-1> | Wt parts |  |  |  |  |  | 57 |
|  | <A-2> |  | 57 | 57 | 57 | 57 | 57 |  |
|  | <A-4> |  |  |  |  |  |  |  |
| Aliphatic polyester | <B-3> | Wt parts | 43 | 43 | 43 | 43 | 43 | 43 |
| Compatibility improver | <C-3-1> | Wt parts |  |  | 43 |  |  |  |
|  | <C-3-2> |  |  |  |  | 43 |  |  |
|  | <C-3-3> |  | 43 | 43 |  |  |  | 43 |
| Dicarboxylic anhydride | <D-1> | Wt parts |  | 0.3 |  |  | 0.3 |  |
| Rubbery polymer | <E-1> | Wt parts |  |  |  |  | 43 |  |
| Antistatic polymer | <G-1> | Wt parts | 21 | 21 | 21 | 21 | 21 | 21 |
|  | <G-2> |  |  |  |  |  |  |  |
|  | <G-3> |  |  |  |  |  |  |  |
| Impact resistance | 3.2 mmt Izod | J/m | 220 | 330 | 110 | 160 | 70 | 200 |
| Heat resistance | High load (1.82 MPa) | ° C. | 66 | 70 | 71 | 68 | 76 | 67 |
| Antistaticity (Surface specific resistance value) | Just after molding | Ω | $1 \times 10^{10}$ | $1 \times 10^{10}$ | $1 \times 10^{10}$ | $1 \times 10^{10}$ | $1 \times 10^{10}$ | $1 \times 10^{10}$ |
|  | After leaving 100 days | Ω | $1 \times 10^{10}$ | $1 \times 10^{10}$ | $1 \times 10^{10}$ | $1 \times 10^{10}$ | $1 \times 10^{10}$ | $1 \times 10^{10}$ |
| Areal ration of (C-2) + (C-3) + (E) in aliphatic polyester |  | % | 60 | 64 | 23 | 38 | 9 | 65 |

|  |  |  | Examples | | | | |
|---|---|---|---|---|---|---|---|
|  |  |  | 104 | 105 | 106 | 107 | 108 |
| Styrene-based resin | <A-1> | Wt parts |  | 71 | 57 | 43 | 36 |
|  | <A-2> |  |  |  |  |  |  |
|  | <A-4> |  | 57 |  |  |  |  |
| Aliphatic polyester | <B-3> | Wt parts | 43 | 29 | 43 | 57 | 64 |
| Compatibility improver | <C-3-1> | Wt parts |  |  |  |  |  |
|  | <C-3-2> |  |  |  |  |  |  |
|  | <C-3-3> |  | 43 | 43 | 43 | 43 | 43 |
| Dicarboxylic anhydride | <D-1> | Wt parts |  |  |  |  |  |
| Rubbery polymer | <E-1> | Wt parts |  |  |  |  |  |
| Antistatic polymer | <G-1> | Wt parts | 21 | 29 | 11 | 21 | 21 |
|  | <G-2> |  |  |  |  |  |  |
|  | <G-3> |  |  |  |  |  |  |
| Impact resistance | 3.2 mmt Izod | J/m | 250 | 210 | 210 | 240 | 240 |
| Heat resistance | High load (1.82 MPa) | ° C. | 63 | 71 | 68 | 63 | 59 |
| Antistaticity (Surface specific resistance value) | Just after molding | Ω | $1 \times 10^{10}$ | $8 \times 10^{9}$ | $1 \times 10^{12}$ | $1 \times 10^{10}$ | $1 \times 10^{10}$ |
|  | After leaving 100 days | Ω | $1 \times 10^{10}$ | $7 \times 10^{9}$ | $9 \times 10^{11}$ | $1 \times 10^{10}$ | $1 \times 10^{10}$ |
| Areal ration of (C-2) + (C-3) + (E) in aliphatic polyester |  | % | 48 | 48 | 60 | 71 | 78 |

TABLE 11

|  |  |  | Examples | | | | Comparative examples | | | | | | |
|---|---|---|---|---|---|---|---|---|---|---|---|---|---|
|  |  |  | 109 | 110 | 111 | 112 | 23 | 24 | 25 | 26 | 27 | 28 | 29 |
| Styrene-based resin | <A-1> | Wt parts |  |  |  |  |  |  |  |  |  |  |  |
|  | <A-2> |  | 21 | 57 | 57 | 57 | 100 |  |  | 57 | 57 | 57 | 57 |
|  | <A-4> |  |  |  |  |  |  |  |  |  |  |  |  |
| Aliphatic polyester | <B-3> | Wt parts | 79 | 43 | 43 | 43 |  | 100 | 100 | 43 | 43 | 43 | 43 |
| Compatibilizer | <C-3-1> | Wt parts |  |  |  |  |  |  |  |  |  |  |  |
|  | <C-3-2> |  |  |  |  |  |  |  |  |  |  |  |  |
|  | <C-3-3> |  | 43 | 43 | 43 | 43 |  |  |  |  |  |  |  |
| Rubbery polymer | <E-1> | Wt parts |  |  |  |  | 43 |  |  | 43 | 43 | 43 | 43 |
|  | <E-2> |  |  |  |  |  |  |  | 11 |  |  |  |  |
| Antistatic polymer | <G-1> | Wt parts | 21 | 21 | 21 | 21 |  |  |  |  | 57 |  |  |
|  | <G-2> |  |  |  |  |  |  |  |  |  |  | 21 |  |
|  | <G-3> |  |  |  |  |  |  |  |  |  |  |  | 21 |
| Nucleating agent | <H-1> | Wt parts |  | 3 |  | 3 |  |  |  |  |  |  |  |
|  | <H-2> |  |  |  | 3 |  |  |  |  |  |  |  |  |
| Filler | <J-1> | Wt parts |  |  |  | 29 |  |  |  |  |  |  |  |
| Impact resistance | 3.2 mmt Izod | J/m | 260 | 190 | 200 | 110 | 230 | 20 | 180 | 200 | 280 | 80 | 50 |
| Heat resistance | High load (1.82 MPa) | °C. | 54 | 77 | 72 | 97 | 90 | 53 | 54 | 70 | 50 | 67 | 68 |
| Antistaticity (Surface specific resistance value) | Just after molding | Ω | $1 \times 10^{10}$ | $1 \times 10^{10}$ | $1 \times 10^{10}$ | $1 \times 10^{10}$ | $>10^{16}$ | $>10^{16}$ | $>10^{16}$ | $>10^{16}$ | $5 \times 10^{9}$ | $6 \times 10^{15}$ | $2 \times 10^{15}$ |
|  | After leaving 100 days | Ω | $1 \times 10^{10}$ | $1 \times 10^{10}$ | $1 \times 10^{10}$ | $1 \times 10^{10}$ | $>10^{16}$ | $>10^{16}$ | $>10^{16}$ | $>10^{16}$ | $4 \times 10^{9}$ | $5 \times 10^{15}$ | $2 \times 10^{15}$ |
| Areal ratio of (C-2) + (C-3) + (E) in aliphatic polyester |  | % | 85 | 58 | 55 | 51 | — | — | 100 | 60 | 60 | 60 | 60 |

From Examples 98 to 112, by adding the styrene-based resin, the aliphatic polyester and at least one selected from the compatibilizer and the dicarboxylic anhydride, the resin composition of the present invention can be greatly improved in impact resistance and have a practical heat resistant temperature, and further have a low surface specific resistance, and furthermore, the surface specific resistance does not varies by surface washing or by a long time and can exhibit an excellent permanent antistaticity, compared to polylactide only (Comparative example 24).

In particular, from Examples 98 to 102, it was found that the impact resistance is more improved as the ratio of (C-2) and (E) present in the aliphatic polyester increases more.

On the other hand, from Comparative examples 26 to 29, if the compatibilizer (C) is not compounded, it is impossible to obtain a resin composition excellent in any of impact resistance and heat resistance and antistaticity, and further, from Comparative example 30, if the compounded amount of the antistatic polymer exceeds 40 wt %, the decrease of heat resistance is significant, and if the volume resistivity of the antistatic polymer exceeds $10^{13}$ Ωcm (Comparative examples 31 and 32), impact resistance and antistaticity become worse.

Industrial Applicability

The resin composition of the present invention can be used as automobile materials, electric or electronic materials, agricultural materials, gardening materials, fishing materials, materials for civil engineering and construction, stationeries, medical materials, toilet seat or sundry goods, or other various uses.

The invention claimed is:

1. A resin composition comprising a styrene-based resin (A), a polylactide (B), a compatibilizer (C) and a dicarboxylic anhydride (D), wherein the compatibilizer (C) is at least any one species described below:
(C-1) a methyl methacrylate polymer;
(C-2) a vinyl-based polymer to which 3 wt % or more of glycidyl ester of unsaturated carboxylic acid unit or unsaturated dicarboxylic anhydride unit is copolymerized;
(C-3) a graft polymer in which 20 to 90 wt % of methyl methacrylate unit is grafted to 10 to 80 wt % of a rubbery polymer; and
(C-4) a block copolymer in which polylactide segment represented by general formula (I) and vinyl-based polymer segment represented by general formula (II) are bonded in a copolymerization ratio ((I)/(II)) of 99/1 to 1/99 wt parts such that (I)+(II) is 100 wt parts,
wherein weight average molecular weights of (C-1) and (C-2) are within a range of 10,000 to 450,000 and a range of 1,000 to 10,000, respectively,

[Formula 1]

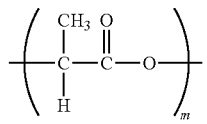

(I)

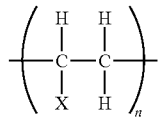

(II)

wherein X is at least one species selected from hydrogen, alkyl group, hydroxyl group, alkyl ester group, cyano group, phenyl group, amido group and halogen group, m and n denote number average molecular weight, and are 1000 to 100,000, respectively, and wherein amounts of the compatibilizer (C) and the dicarboxylic anhydride (D) are 0.01 to 60 weight parts and 0.05 to 5 weight parts based on 100 parts in total of the resin (A) and the polylactide (B), respectively.

2. A resin composition according to claim 1, wherein the dicarboxylic anhydride (D) is at least any one species of maleic anhydride and succinic anhydride.

3. A resin composition according to claim 1, wherein 1 to 60 weight parts based on 100 parts in total of the resin (A) and the polylactide (B) of a rubbery polymer (E) is further compounded therein.

4. A resin composition according to claim 3, wherein the rubbery polymer (E) is a graft polymer in which 10 to 70 wt % of aromatic vinyl-based units and 10 to 50 wt % of vinyl cyanide-based units are graft polymerized to 10 to 80 wt % of a rubbery polymer.

5. A resin composition according to claim 1, wherein the compatibilizer (C) is (C-2) and/or (C-3), and if a total area of the compatibilizer (C-2) and/or (C-3) in cross-sectional photomicrograph of the resin composition is 100%, an areal ratio of the compatibilizer (C-2) and/or (C-3) in the polylactide (B) is 10 to 90%.

6. A resin composition according to claim 3, wherein the compatibilizer (C) is (C-2) and (C-3) components, when total area of (C-2), (C-3) and the rubbery polymer (E) in a cross-sectional photomicrograph of the resin composition is 100%, an areal ratio of (C-2), (C-3) and the rubbery polymer (E) in the polylactide (B) is 10 to 90%.

7. A resin composition according to claim 1, in which less than 85 weight parts based on 100 parts in total of the resin (A) and the polylactide (B) of at least one species selected from polycarbonate, aromatic polyester, polyethylene, polypropylene and polyvinyl chloride (F), is further compounded therein.

8. A resin composition according to claim 1, in which 1 to 30 weight parts based on 100 parts in total of the resin (A) and the polylactide (B) of a polymer having a volume resistivity of $10^{13}$ Ωcm (G) or less, is further compounded therein, wherein the volume resistivity is determined according to ASTM D257.

9. A resin composition according to claim 1, wherein the polylactide (B) is less than 50 wt % based on 100 wt % in total of the styrene-based resin (A) and the polylactide (B).

10. A molded article made of the resin composition of claim 1.

* * * * *